(12) United States Patent
Ito et al.

(10) Patent No.: US 7,806,959 B2
(45) Date of Patent: Oct. 5, 2010

(54) METALLIC IRON NUGGETS

(75) Inventors: Shuzo Ito, Kobe (JP); Yasuhiro Tanigaki, Kobe (JP); Isao Kobayashi, Kobe (JP); Osamu Tsuge, Kobe (JP); Keisuke Honda, Kobe (JP); Koji Tokuda, Kobe (JP); Shoichi Kikuchi, Kobe (JP)

(73) Assignee: Midrex International B.V. Zurich Branch, Zurich (CH)

( * ) Notice: Subject to any disclaimer, the term of this patent is extended or adjusted under 35 U.S.C. 154(b) by 0 days.

(21) Appl. No.: 11/757,504

(22) Filed: Jun. 4, 2007

(65) Prior Publication Data

US 2007/0227301 A1    Oct. 4, 2007

Related U.S. Application Data

(60) Continuation of application No. 11/296,320, filed on Dec. 8, 2005, now abandoned, which is a division of application No. 10/332,951, filed as application No. PCT/JP02/04677 on May 15, 2002, now abandoned.

(30) Foreign Application Priority Data

May 15, 2001    (JP) ............................. 2001-145566

(51) Int. Cl.
    C21B 13/08    (2006.01)
(52) U.S. Cl. .............................. 75/477; 75/480; 75/503
(58) Field of Classification Search ...................... None
    See application file for complete search history.

(56) References Cited

U.S. PATENT DOCUMENTS

| | | | |
|---|---|---|---|
| 4,957,545 A * | 9/1990 | Hikosaka et al. ............... | 75/501 |
| 5,944,871 A * | 8/1999 | Nagl ........................... | 75/445 |
| 5,989,019 A | 11/1999 | Nishimura et al. | |
| 6,036,744 A | 3/2000 | Negami et al. | |
| 6,063,156 A | 5/2000 | Negami et al. | |
| 6,129,777 A | 10/2000 | Fuji et al. | |
| 6,149,709 A | 11/2000 | Uragami et al. | |
| 6,152,983 A | 11/2000 | Kamijo et al. | |
| 6,210,462 B1 * | 4/2001 | Kikuchi et al. ................. | 75/485 |
| 6,214,086 B1 | 4/2001 | Montague et al. | |

(Continued)

FOREIGN PATENT DOCUMENTS

AU        43243        9/1968

(Continued)

OTHER PUBLICATIONS

Takuya Negami, "ITmk3—Premium Ironmaking Process for the New Millennium", Direct From MIDREX, XP002318285, Mar. 2001, pp. 7-9.

(Continued)

*Primary Examiner*—George Wyszomierski
(74) *Attorney, Agent, or Firm*—Oblon, Spivak, McClelland, Maier & Neustadt, L.L.P.

(57) ABSTRACT

Metallic iron nuggets made by reducing-melt of a material containing a carbonaceous reductant and a metal-oxide-containing material, the metallic iron nuggets comprising at least 94% by mass, hereinafter denoted as "%", of Fe and 1.0 to 4.5% of C, and having a diameter of 1 to 30 mm are disclosed.

13 Claims, 15 Drawing Sheets

U.S. PATENT DOCUMENTS

| | | |
|---|---|---|
| 6,224,820 B1 | 5/2001 | Sawa et al. |
| 6,241,803 B1 | 6/2001 | Fuji |
| 6,251,156 B1 | 6/2001 | Hoffman et al. |
| 6,251,161 B1 | 6/2001 | Tateishi et al. |
| 6,254,665 B1 | 7/2001 | Matsushita et al. |
| 6,258,149 B1 | 7/2001 | Sugiyama et al. |
| 6,296,479 B1 | 10/2001 | Nishimura et al. |
| 6,302,938 B1 | 10/2001 | Kamijo et al. |
| 6,319,302 B1 | 11/2001 | Harada |
| 6,334,883 B1 | 1/2002 | Takenaka et al. |
| 6,368,379 B1 | 4/2002 | Tateishi et al. |
| 6,500,381 B1 | 12/2002 | Harada |
| 6,503,289 B2 | 1/2003 | Tanigaki et al. |
| 6,511,316 B2 | 1/2003 | Harada et al. |
| 6,517,770 B1 | 2/2003 | Tateishi et al. |
| 6,521,171 B2 | 2/2003 | Tateishi et al. |
| 6,569,223 B2 | 5/2003 | Tanigaki et al. |
| 6,579,505 B2 | 6/2003 | Tsuchiya et al. |
| 6,585,800 B2 | 7/2003 | Sugitatsu et al. |
| 6,592,647 B2 | 7/2003 | Hino et al. |
| 6,592,649 B2 | 7/2003 | Kikuchi et al. |
| 6,602,320 B2 | 8/2003 | Fuji et al. |
| 2001/0037703 A1* | 11/2001 | Fuji et al. .............. 75/483 |
| 2006/0021469 A1 | 2/2006 | Ito et al. |

FOREIGN PATENT DOCUMENTS

| | | |
|---|---|---|
| AU | 783929 | 10/2001 |
| AU | 784317 | 1/2002 |
| CA | 2 306 805 | 4/1999 |
| CN | 1268187 | 9/2000 |
| EP | 1 167 547 A1 | 1/2002 |
| JP | 57-104610 | 6/1982 |
| JP | 11-241111 | 9/1999 |
| JP | 11-337264 | 12/1999 |
| WO | WO 00/29628 | 5/2000 |
| WO | WO 01/73137 A2 | 10/2001 |

OTHER PUBLICATIONS

Database Compendex Online!, AN E2002457193500, XP-002318286, I Kobayashi, et al., "A New Process to Produce Iron Directly from Fine Ore and Coal", vol. 28, No. 9, Sep. 2001 (1 pg.).

Machin translation of JP 11-241111 into English, date of JP publication Jul. 9, 1999.

USPTO translation of JP 11-241111 into English, translation date Jan. 2006.

U.S. Appl. No. 12/183,947, filed Jul. 31, 2008, Tsuge, et al.

* cited by examiner

EXAMPLE OF TWO-STAGE HEATING IN SMELTING REDUCTION

FIG.7 RELATIONSHIP BETWEEN METALLIZATION RATIO AND REDUCTION RATIO

METALLIC IRON NUGGETS

CROSS REFERENCE TO RELATED APPLICATIONS

This application is a continuation of U.S. patent application Ser. No. 11/296,320, filed Dec. 8, 2005, now abandoned, which is a divisional application of U.S. patent application Ser. No. 10/322,951, filed Jan. 14, 2003, now abandoned, which is a 371 of PCT/JP02/04677 filed May 15, 2002. This application claims priority to Japanese Patent Application No. 2001-145566, filed May 15, 2001, the disclosures of which are incorporated herein by reference in their entireties.

TECHNICAL FIELD

The present invention relates to metallic iron nuggets made by reducing-melt of a material containing iron oxide, such as iron ore, and a carbonaceous reductant, such as coke, the metallic iron nuggets having a high Fe purity, specified C, S, Si, and Mn contents, and a specified diameter.

BACKGROUND ART

A direct iron-making process for making reduced iron by direct reduction of an iron oxide source such as iron ore using a carbonaceous substance or a reducing gas has long been known. Extensive research has been conducted as to the specifics of the reducing process and continuous reduction equipment.

For example, Japanese Unexamined Patent Application Publication No. 11-337264 discloses a rotary hearth that allows efficient continuous production of reduced iron, in which, during reduction by heating of green pellets prepared by solidifying a mixture of an iron oxide source such as steelmaking dust or fine ore and a carbonaceous substance using a binder, explosions which occur when undried green pellets are rapidly heated are prevented due to installation of a preheating zone.

In the technology, including the above-described technology, for making metallic iron by heating and reducing compacts containing an iron oxide source and a reductant, a considerable amount of a slag component becomes mixed in the resulting metallic iron due to the use of the iron ore or the like. In particular, in a method for making sponge metallic iron, the Fe purity is drastically low because the separation of the slag component that became mixed in the metallic iron is difficult. Thus, a preliminary treatment for removing this considerable amount of slag component is required when these materials are used as an iron source. Moreover, nearly all of the metallic iron obtained by a known direct ironmaking process is sponge-shaped, and thus the handling thereof as an iron source is difficult since such metallic iron is fragile. In order to actually use such metallic iron as a material for making iron, steel, or alloy steel, a process such as a secondary process to make briquettes therefrom is required, and the expenses for additional equipment therefor are considerable.

Japanese Unexamined Patent Application Publication No. 9-256017 discloses a method for making metallic iron nuggets having a high metallization ratio, the method including heating and reducing compacts containing iron oxide and a carbonaceous reductant until a metallic iron sheath is formed and substantially no iron oxide is present in the inner portion while forming nuggets of the produced slag in the inner portion, continuing heating so as to allow the slag inside to flow outside of the metallic iron sheath so as to separate the slag, and further performing heating so as to melt the metallic iron sheath.

In the known processes, including these conventional techniques, for making metallic iron nuggets, no technology capable of efficiently making metallic iron having a diameter within a predetermined range while fully considering the quality and handling convenience of materials for making iron, steel, or iron alloy has been established. As for the purity of the metallic iron nuggets, although high-purity metallic iron nuggets with a low contaminant content are naturally preferred, no specific idea for specifying the optimum carbon content in the metallic iron nuggets used as the material for iron making and steelmaking has been formulated. Moreover, no specific manufacturing technology for controlling the carbon content within a predetermined range has been established.

Furthermore, when metallic iron is made by reducing iron oxide such as ore, coke or a coal powder is generally used as the reductant. However, these reductants normally have a high sulfur (S) content. Since the reductant becomes mixed in the metallic iron produced, the resulting metallic iron nuggets normally have a high S content. Accordingly, the metallic iron nuggets must be subjected to desulfurization before they are actually used as the material for making iron or steel. This is also one of the main reasons for the degradation in quality of the metallic iron nuggets.

Accordingly, in order to make metallic iron nuggets of high value by a reducing-melt process, it is not sufficient to merely hope to increase the purity. A technology that can reliably make metallic iron, in which the contaminant content, such as a sulfur content, is specified and the size of which is optimized in view of production possibility and handling quality, the technology also being capable of satisfying the demands in the market such as a greater flexibility in the choice of material for making iron, steel, or various alloy steels, and reduction of the cost required for making iron or steel using, for example, an electric furnace, is required to be established.

The present invention is developed based on the above-described background. An object of the present invention is to provide metallic iron nuggets of stable quality that have an optimum size in view of the overall production possibility and handling quality as an iron source, and in which the contaminant content of the metallic iron nuggets, such as carbon and sulfur contents, is specified. The metallic iron nuggets of the present invention can thus satisfy the demands in the market such as a greater flexibility in the choice of material for making metallic iron and a reduction of the cost required for making iron or steel using, for example, an electric furnace.

DISCLOSURE OF INVENTION

Metallic iron nuggets of the present invention that overcome the above-described problems are metallic iron nuggets having an Fe content of 94% (percent by mass, contents of components are in terms of percent by mass) or more, a C content of 1.0 to 4.5%, a S content of 0.20% or less, and a diameter of 1 to 30 mm, the metallic iron nuggets being made by reducing-melt of a material containing a carbonaceous reductant and an iron-oxide-containing material.

The metallic iron nuggets of the present invention need not be spherical. Granular substances having an elliptical shape, an oval shape, and slightly deformed shapes thereof are also included in the metallic iron nuggets of the present invention. The diameter of the nuggets ranging from 1 to 30 mm is determined by dividing the total of the lengths of the major axis and the minor axis and the maximum and minimum thicknesses of a nugget by 4.

Preferably, the metallic iron nuggets further include 0.02 to 0.50% of Si and less than 0.3% of Mn.

The metallic iron nuggets are prepared by heating the material so as to react a metal oxide contained in the material with the carbonaceous reductant and a reducing gas produced by such a reaction and to reduce the metal oxide in the solid state, and further heating the resulting reduced iron in a reducing atmosphere so as to carburize and melt the resulting reduced iron and allow the reduced iron to cohere while excluding any by-product slag. During this process, a CaO source is added to the material to adjust the basicity of the slag components in the material, i.e., $CaO/SiO_2$, within the range of 0.6 to 1.8. In this manner, sulfur contained in the material can be efficiently captured by the slag produced during reducing-melt, and metallic iron nuggets having a S content of 0.08% or less can be obtained.

The amount of the carbonaceous reductant is adjusted so that the remaining carbon content during the step of reducing-melt of the material is in the range of 1.5 to 5.0% when the metallization ratio of the metallic iron nuggets after the solid reduction is 100%. In this manner, the resulting carbon content can be controlled within the above-described range.

BRIEF DESCRIPTION OF THE DRAWINGS

FIG. 3 is an explanatory cross-sectional view in which FIG. 1 is developed in the longitudinal direction.

BEST MODE FOR CARRYING OUT THE INVENTION

Figure 1:
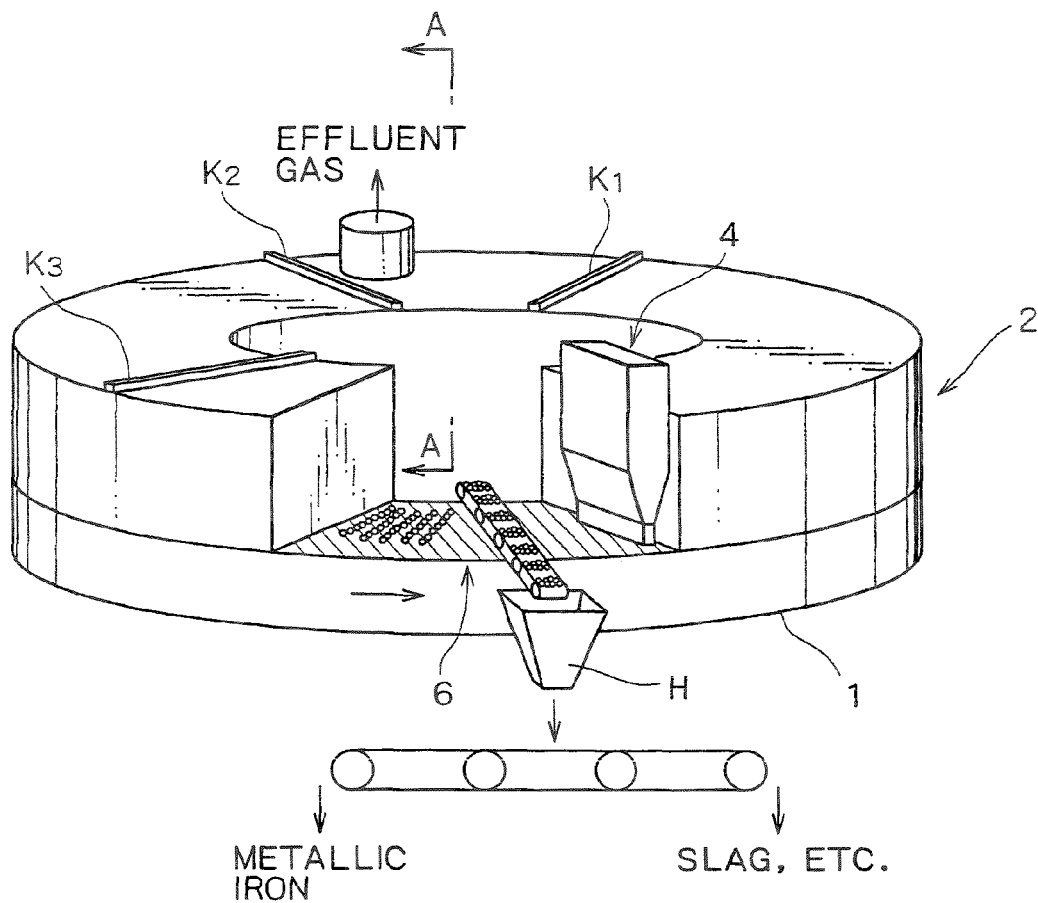
FIG. 1 is an explanatory schematic view showing an example of reducing-melt equipment for making metallic iron nuggets of the present invention.

Metallic iron nuggets of the invention are granular metallic iron made by reducing-melt of a material containing a carbonaceous reductant and an iron-oxide containing material. The metallic iron nuggets contain 94% or more (more preferably 96% or more) of Fe and 1.0 to 4.5% (more preferably 2.0 to 4.0%) of C. Preferably, the S content of the metallic iron nuggets is 0.20% or less, more preferably, 0.08% or less, and the diameter is in the range of 1 to 30 mm (more preferably 3 to 20 mm). The reasons for setting these ranges are as follows.

The Fe content of the metallic iron nuggets is the primary factor that controls the quality of the metallic iron nuggets. Naturally, the higher the Fe purity, i.e., the lower the contaminant content, the better. In the present invention, the required Fe purity is 94% or more, and more preferably, 96% or more. The reason for this is as follows. When metallic iron nuggets having a contaminant content exceeding 5% are used as a material for iron and steelmaking, the contaminants contained in the material float on the surface of a bath and form slag, which is difficult to remove. Moreover, because elements, such as S, Mn, Si, and P, dissolved in a molten steel adversely affect the physical properties of the end products made using the resulting metallic iron, processes such as desulfurization, dephosphorization, and desiliconization are necessary during an refinning step. These preliminary treatments require substantial time and effort. Accordingly, the Fe content of the metallic iron nuggets of the present invention must be at least 94%, and more preferably, at least 96%.

The C content of the metallic iron nuggets is essential in securing the required amount of C to suit the steel grade when the metallic iron is used as a material for steelmaking, and is important in view of increasing versatility as material iron. Accordingly, the C content of the metallic iron nuggets is preferably at least 1.0%, and more preferably, at least 2.0%. When the metallic iron contains excessive amounts of carbon, the tenacity and the shock resistance of steel or alloy steel made from such metallic iron are adversely affected, and thus the steel or alloy steel becomes fragile. Thus, a decarburization process such as blowing becomes necessary during the process of refinning. In order to use the metallic iron nuggets as a material for iron and steelmaking without being burdened by these additional processes and without hindrance, the C content must be 4.5% or less, and more preferably, 4.0% or less.

Sulfur adversely affects the physical properties of steel and is thus usually considered undesirable, although sulfur can be used to increase merchantability of some types of steel grade. The metallic iron nuggets of the invention used as a material preferably contain 0.20% or less, and more preferably, 0.08% or less of sulfur. In order to increase the applicable range of the metallic iron nuggets as an iron source so that the metallic iron nuggets can be used in various steelmaking processes, the Si content should be in the range of 0.02 to 0.5%, and the Mn content should be less than 0.3%.

The metallic iron nuggets of the invention having the above-described C, S, Si, and Mn contents are particularly advantageous when compared to most commonly used pig iron made using blast furnaces. The pig iron made using blast furnaces generally contains 4.3 to 4.8% C, 0.2 to 0.6% Si, and 0.3 to 0.6% Mn, although the contents of C, S, Mn, Si, and the like in the pig iron made using a blast furnace vary according to the type of metal oxide and coke used therein, operation conditions, and the like. Especially in blast furnace iron making, the produced molten metallic iron is carburized at the bottom part of the blast furnace in a high reducing atmosphere in the presence of a large amount of coke; hence, the C content is nearly saturated. Since $SiO_2$, which is included as a gangue component, is readily reduced in a high-temperature atmosphere in the presence of a large amount of coke, approximately 0.2 to 0.6% of Si is contained in the molten metallic iron, and it is difficult to obtain molten metallic iron having a Si content of less than 0.20%. Moreover, since MnO is easier to reduce than $SiO_2$, MnO is readily reduced in a highly reducing atmosphere when a large amount of MnO is included in the material iron ore. As a result, the Mn content in the molten metallic iron becomes inevitably high.

In contrast, the metallic iron nuggets of the present invention made by a process described below contain 1.0 to 4.5% C, 0.02 to 0.5%, and more preferably less than 0.2%, Si, and less than 0.3% Mn. The metallic iron nuggets of the present invention differ from common metallic iron described above in the composition. Furthermore, as described below, the S content of the metallic iron nuggets of the present invention is reduced by using a CaO source during the step of making a material compact so as to increase the basicity of the slag components. The metallic iron nuggets of the present invention is distinguishable from metallic iron made according to a common process in that the S content is 0.08% or less.

It is essential that the metallic iron nuggets of the present invention have a diameter in the range of 1 to 30 mm. Minute particles having a diameter less than 1 mm cause quality and handling problems because fine slag components easily become mixed with such minute particles and such minute particles of metallic iron fly off easily.

The upper limit of the diameter is set in view of reliably obtaining a predetermined level of the Fe purity within required manufacturing restrictions. In order to obtain large nuggets having a diameter exceeding 30 mm, large compacts must be used as a material. With such large material compacts, the time taken to conduct heat toward the inside of the material compacts during a process of solid reduction, carburization, and melting, particularly during solid reduction, for making metallic iron nuggets, is long, decreasing the efficiency of solid reduction. Moreover, the incorporation of the molten iron after carburization and melting due to cohesion does not proceed uniformly. As a result, the produced metallic iron nuggets have complex and irregular shapes, and metallic iron nuggets having a uniform diameter and quality cannot be obtained.

The size and shape of the iron nuggets are affected by various factors including the size of the material compacts as described above, the composition of the material (the type of metal oxide source and the composition of the slag) the carburization amount after solid reduction, the furnace atmosphere temperature (particularly the atmosphere temperature in the region where carburization, melting, and cohesion are performed), and the supply density at which the material compacts are supplied to the reducing-melt furnace. The supply density and the size of the material compacts have the same influence. The higher the supply density, the likelier it is for the molten metallic iron produced by carburization and melting to form large nuggets on a hearth due to cohesion and incorporation. By gradually increasing the supply density of the material compacts and eventually stacking the material compacts on a hearth, the chance that molten metallic iron incorporates to form large nuggets can be increased. However, when the supply density is excessively high, the heat conduction ratio in the furnace decreases, and thus the solid reduction ratio cannot be increased. Moreover, uniform cohesion and incorporation become difficult, and the resulting metallic iron nuggets will have complex and irregular shapes. Metallic iron nuggets having a uniform diameter and a uniform shape cannot be obtained.

These problems derived from the size of the material compacts and the like are particularly acute when metallic iron nuggets having a diameter of 30 mm or more as products are made. No such problems occur in making nuggets having a diameter of 30 mm or less, and nuggets having a relatively uniform diameter of 30 mm or less and a relatively uniform shape can be obtained. In view of the above, the diameter is limited to 30 mm or less in the present invention. It should be noted that nuggets having a highly uniform diameter, shape, and quality can be obtained at a diameter of 3 to 15 mm.

The size of the produced metallic iron nuggets is also affected by the type and the characteristics of the iron ore contained in the material compacts. Generally, the cohesion property is satisfactory when magnetite iron ore is used as an iron oxide source. However, not all of the iron content in one material compact necessarily coheres into one metallic iron nugget. The iron content in one material compact frequently forms two or three nuggets. The cause of such a phenomenon is not precisely known, but a complex combination of difference in oxygen content, in crystal structure of iron ore, in slag composition derived from the gangue composition are considered as possible causes. In any case, metallic iron nuggets having a relatively uniform diameter and shape can be obtained at a diameter of the product nuggets of 30 mm or less.

The metallic iron nuggets of the present invention satisfy all of the requirements described above and can be effectively used as an iron source for making iron, steel, or alloy steel using various facilities for iron, steel, or alloy-steelmaking, such as an electric furnace.

An embodiment of a method for making metallic iron nuggets satisfying the above requirements will now be described in detail with reference to the drawings.

Figure 2:
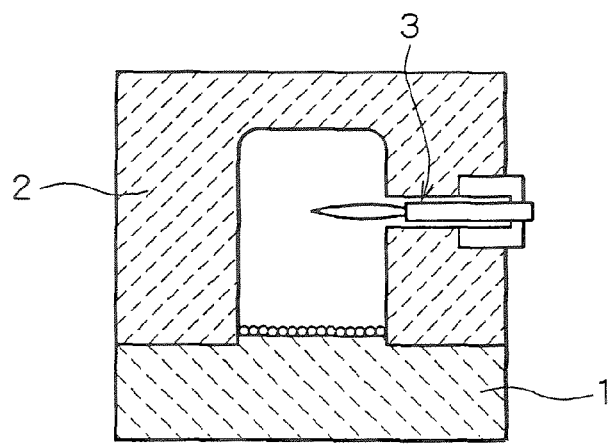
FIG. 2 is a cross-sectional view taken along line A-A in FIG. 1.
Figure 3:
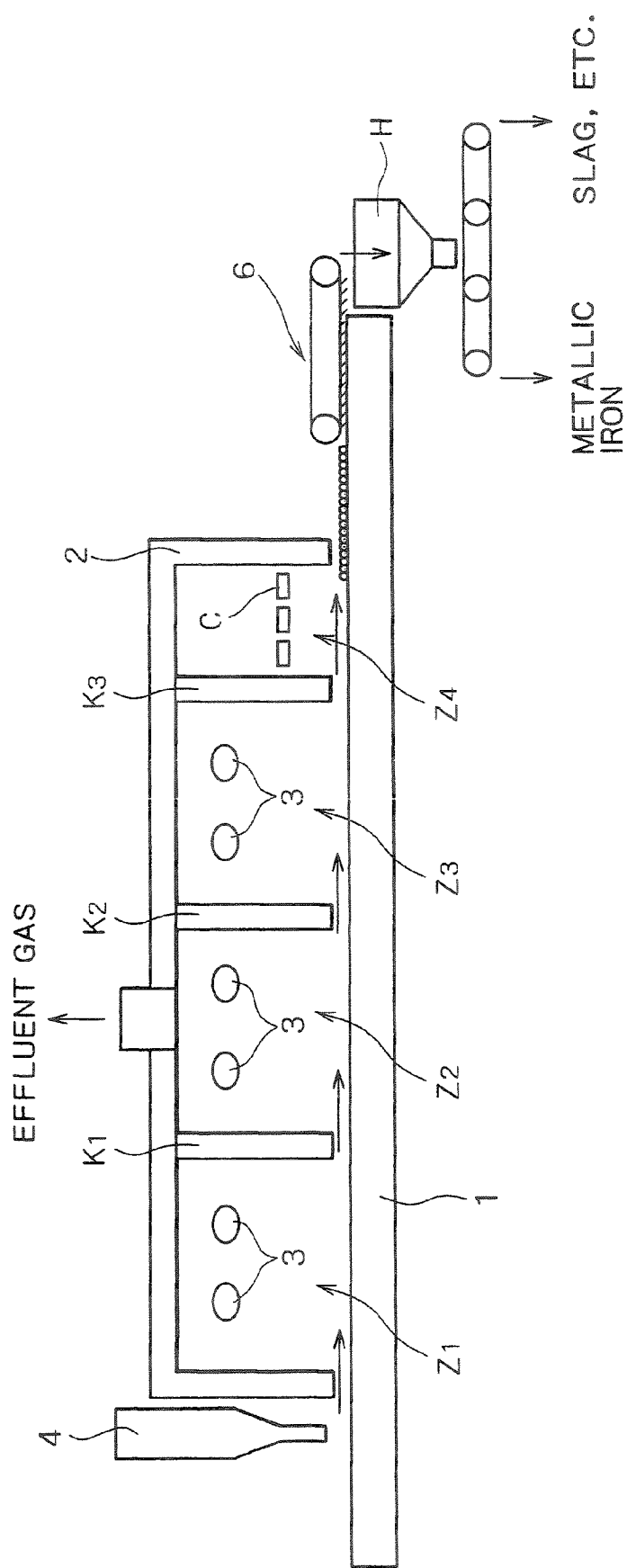

FIGS. 1 to 3 are schematic illustrations showing an example of a reducing-melt furnace of a rotary hearth type developed by the inventors used for making metallic iron nuggets of the present invention. The reducing-melt furnace has a ring-shaped movable hearth and a dome-shaped structure. FIG. 1 is a schematic illustration thereof, FIG. 2 is a cross-sectional view taken along line A-A in FIG. 1, and FIG. 3 is a cross-sectional view of the movable hearth, developed in a moving direction to promote understanding of the structure. In the drawings, reference numeral 1 denotes a rotary hearth, and reference numeral 2 denotes a furnace casing that covers the rotary hearth. The rotary hearth 1 is configured to rotate at an adequate speed by a driver not shown in the drawing.

A plurality of combustion burners 3 is provided at suitable positions of the wall of the furnace casing 2. The combustion heat and the radiant heat thereof from the combustion burners 3 are applied to material compacts on the rotary hearth 1 so as to perform heat reduction of the compacts. The furnace casing 2 shown in the drawing is a preferable example and is divided by three partitions $K_1$, $K_2$, and $K_3$ into a first zone $Z_1$, a second zone $Z_2$, a third zone $Z_3$, and a fourth zone $Z_4$. At the uppermost stream in the rotation direction of the furnace casing 2, a feeder 4 for feeding material and an auxiliary material, the feeder 4 facing the rotary hearth 1, is provided. At the lowermost stream in the rotation direction, i.e., the position upstream of the feeder 4 because of the rotatable structure, a discharger 6 is provided.

In operating this reducing-melt furnace, while allowing the rotary hearth 1 to rotate at a predetermined speed, material compacts containing iron ore or the like and a carbonaceous substance are supplied from the feeder 4 until an adequate thickness is reached. The material compacts placed on the rotary hearth 1 receive the combustion heat and the radiant heat thereof from the combustion burners 3 during the course of traveling through the first zone $Z_1$. The metal oxide contained in the compacts is reduced while sustaining its solid state due to the carbonaceous substance in the compacts and carbon monoxide produced by burning the carbonaceous substance. Subsequently, the material compacts are further reduced by heating in the second zone $Z_2$. The resulting iron, which is substantially completely reduced, is then further heated in a reducing atmosphere in the third zone $Z_3$ so as to carburize and melt the reduced iron while allowing the reduced iron to separate from by-product slag and form nuggets, i.e., metallic iron nuggets. Subsequently, the resulting metallic iron nuggets are cooled and solidified in the fourth zone $Z_4$ by a suitable cooling means C, and are sequentially discharged by the discharger 6 at the downstream of the cooling means C. At this time, the by-product slag derived from the gangue component, etc., in the iron ore is also discharged. The by-product slag is separated from the metallic iron by suitable separating means, such as a screen and a magnetic separation apparatus, after the slag and the metallic iron is fed to a hopper H. The resulting metallic iron nuggets have an iron purity of approximately 94% or more, and more preferably, 96% or more, and contain a significantly low amount of the slag component.

It should be noted that although the fourth zone $Z_4$ in the drawing is of an open-air type, the fourth zone $Z_4$ is preferably provided with a cover so as to prevent heat dissipation as much as possible and to suitably adjust the atmosphere inside the furnace in actual operation. Moreover, although, in this embodiment, the rotary furnace is divided into the first zone $Z_1$, the second zone $Z_2$, the third zone $Z_3$, and the fourth zone $Z_4$ using three partitions $K_1$ to $K_3$, the zone configuration of the furnace is not limited to this structure. Naturally, the zone configuration may be modified according to the size of the furnace, the required manufacturing capacity, the operation mode, or the like. However, in order to efficiently manufacture the metallic iron nuggets of the present invention, a structure in which a partition is provided at least between the solid-reduction area of the first half period of the heating reduction, and the carburization, melting, and cohesion area of the second half period of the heating reduction so that the furnace temperature and the atmosphere gas can be separately controlled is preferable.

During the above reducing-melt process, when the atmosphere temperature during the reduction (solid reduction period) is excessively high, i.e., when the atmosphere temperature exceeds the melting point of the slag components including the gangue component, unreduced iron oxide, and the like during a certain period in the reduction process, iron oxide (FeO) in the material melts before it is reduced. As a result, smelting-reduction rapidly occurs due to the reaction of the molten iron oxide with carbon contained in the carbonaceous substance. Note that smelting-reduction is a phenomenon in which a material is reduced in a molten state, and is different from solid reduction. Metallic iron can still be produced by smelting-reduction; however, when reduction occurs in the molten state, the separation of reduced iron from by-product slag is difficult. Moreover, the reduced iron is obtained in the form of a sponge, which is difficult to make nuggets therefrom, and the slag content in the reduced iron becomes high. Accordingly, it becomes difficult to achieve an Fe content within the range specified by the present invention. Furthermore, the molten metallic iron formed by incorporation due to cohesion may flow on the hearth and may become planular instead of granular.

Figure 4:
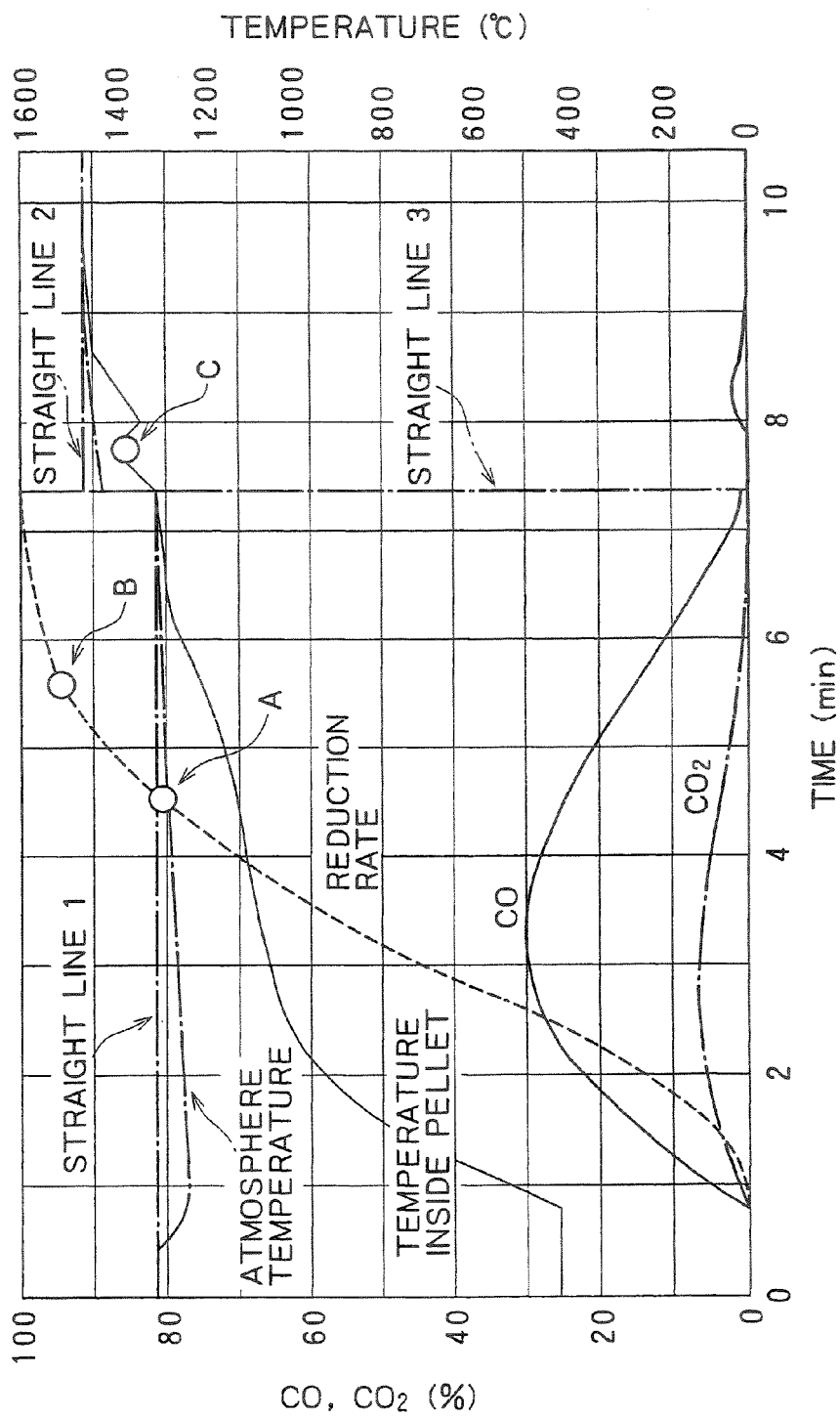
FIG. 4 is a graph showing the transitions of the atmosphere temperature, the temperature of material compacts, the reduction ratio, and the amount of CO and $CO_2$ gasses throughout a solid-reduction period and a melting period when a two-stage heating process is employed in the present invention.

FIG. 4 shows the state of the reaction when material compacts (pellets having a diameter of 16 to 19 mm) containing iron ore as an iron oxide source and coal as a carbonaceous reductant are fed to a furnace having an atmosphere temperature of approximately 1,300° C. (the straight line 1 in the graph) so as to solid-reduce the material compacts until a reduction ratio of 100% (the elimination ratio of oxygen in the iron oxide in the material compacts) is reached, and then the resulting reduced iron is fed to a melting zone controlled at approximately 1425° C. (straight line 2) beginning at the time indicated by straight line 3 in the drawing so as to melt the resulting reduced iron. In the graph, the temperature inside the compacts, the atmosphere temperature of the furnace, and changes of carbon dioxide and carbon monoxide over time produced during the reduction process are also shown. The temperature inside the compacts is continuously measured using a thermocouple inserted into the material compacts in advance.

As is apparent from this graph, in order to maintain the solid state of the material compacts fed into the furnace and to reduce the material compacts to a reduction ratio (oxygen elimination ratio) of 80% (point A in FIG. 4) or more, and more preferably, 94% (point B in FIG. 4) or more, the furnace temperature is preferably maintained in the range of 1,200 to 1,500° C., and more preferably, 1,200 to 1,400° C., to perform solid reduction, and subsequently increased to 1,350 to 1,500° C. to reduce the remaining iron oxide while allowing the produced metallic iron to form nuggets by carburization and melting. According to this two-stage heating process, metallic iron nuggets having a high Fe purity can be reliably and efficiently manufactured.

The time indicated by the horizontal axis in FIG. 4 may vary depending on the composition of the iron ore or the carbonaceous substance constituting the material compacts. Normally, solid reduction of the iron oxide, melting, cohesion, and incorporation can be completed and metallic iron nuggets can be made within 10 to 13 minutes.

If solid reduction of the material compacts is stopped at a reduction ratio of less than 80% and melting is started therefrom, sponge-shaped metallic iron is produced, and formation of nuggets from such metallic iron is difficult. Moreover, it is difficult to achieve an Fe content of 94% or more in the resulting metallic iron. In contrast, when the solid reduction is performed until a reduction ratio of 80% or more, and more preferably 94% or more is reached and then the subsequent step of carburization, melting, and cohesion is performed, the remaining FeO in the material compacts can be effectively reduced regardless of the type and the composition of the iron ore in the material compacts. Moreover, in the subsequent step of carburization and melting, nuggets can grow while excluding the by-product slag. Thus, metallic iron nuggets having a high Fe content and a relatively uniform diameter can be obtained.

In the solid-reduction region shown in the first part of FIG. 4, the preferable furnace temperature that can securely achieve a high reduction ratio is 1,200 to 1,500° C., and more preferably 1,200 to 1,400° C. At a furnace temperature of less than 1,200° C., the solid reduction reaction progresses slowly, and thus the dwell time in the furnace must be made longer, resulting in poor productivity. At a furnace temperature of 1,200° C. or more, and particularly 1,500° C. or more, the metallic iron nuggets incorporate with one another to form large nuggets of irregular shapes. Such metallic iron nuggets are not preferable as a product.

The metallic iron nuggets may not incorporate with one another to form large nuggets in a temperature range of 1,400 to 1,500° C. depending on the composition and the amount of the iron ore in the material. However, this possibility and frequency are low. Thus, the temperature during the solid reduction period is preferably 1,200 to 1,500° C., and more preferably 1,200 to 1,400° C. In actual operation, it is possible to adjust the furnace temperature to 1,200° C. during the early stage of the solid reduction period and then increase the furnace temperature to 1,200 to 1,500° C. during the latter stage of the solid reduction.

The compacts subjected to the required reduction in the solid-reduction zone are transferred to a melting zone having a high furnace temperature of 1,425° C. The temperature inside the compacts increases as shown in FIG. 4, drops after reaching a point C, and then increases again until a predetermined temperature of 1,425° C. is reached. The temperature drop at point C is caused by latent heat accompanying melting of the reduced iron, i.e., the point C can be considered as the starting point of the melting. This starting point is substantially determined by the residual carbon content in the reduced iron particles. Since the melting point of the reduced iron drops as a result of the carburization by the residual carbon and a CO gas, melting of the reduced iron is accelerated.

In order to rapidly melt the reduced iron, a sufficient amount of carbon for carburization must remain in the reduced iron after the solid reduction. The content of the residual carbon is determined by the amount of the iron ore and the carbonaceous substance used in making the material compacts. The inventors have confirmed through experiments that when the amount of the carbonaceous substance is initially adjusted so that the residual carbon content, i.e., the excess carbon content, in the solid-reduced substance is 1.5% at the time the final reduction ratio during the solid-reduction period reaches 100%, i.e., at the time the metallization ratio reaches 100%, the reduced iron can be rapidly carburized, thereby causing a drop in the melting point. Accordingly, the reduced iron can rapidly form nuggets having a suitable diameter by cohesion and incorporation in a temperature range of 1,300 to 1,500° C. Note that when the residual carbon content of the solid-reduced carbon is less than 1.5%, the melting point of the reduced iron does not drop sufficiently due to the shortage of carbon for carburization, and the heating temperature must thus be increased to 1,500° C. or more.

When the carburization amount is zero, i.e., when pure iron is involved, the melting temperature is 1,530° C., and the reduced iron can be melted by heating at a temperature exceeding this temperature. However, in actual furnaces, the operating temperature is preferably low to reduce heat load imposed on furnace refractories. The operating temperature is preferably approximately 1,500° C. or less. In particular, the operating conditions are preferably adjusted to allow a temperature increase of approximately 50 to 200° C. after the staring point C of melting, which is the beginning of the melting and cohesion period. In order to smoothly and effectively perform the above-described solid reduction, carburization, and melting, the temperature during the carburization and melting is preferably 50 to 200° C., and more preferably, 50 to 150° C., higher than the temperature during the solid reduction.

In this invention, the final carbon content in the end product metallic iron nuggets must be in the range of 1.0 to 4.5%, and more preferably, 2.0 to 4.0%. The final carbon content is substantially determined by the amount of the carbonaceous substance used in making material compacts and atmospheric adjustments during the solid-reduction period. Especially, the lower limit of the carbon content is determined by the residual carbon content in the reduced iron during the final stage of the solid reduction and the retention time (carburization amount) during the period following the period of solid reduction. If a reduction ratio of 100% is nearly achieved during the final stage of the solid reduction as described above while securing 1.5% of the residual carbon content, the end product of the metallic iron nuggets can have a carbon content of 1.0% or more. Moreover, the inventors have also confirmed that when the residual carbon content in the reduced iron upon completion of the solid reduction is 5.0% and carburization, melting, and cohesion of this reduced iron are performed during the subsequent period of melting and cohesion, the carbon content in the resulting metallic iron nuggets can be increased to 4.5%. However, in order to reliably obtain metallic iron nuggets having a final carbon content of 2.0 to 4.0%, the residual carbon content in the reduced iron after completion of the solid reduction is preferably controlled in the range of 1.5 to 4.5%.

As for the atmosphere gas in the process, during the period in which solid reduction is rapidly progressed, a large amount of CO is generated by the reaction of the metal oxide with the carbonaceous substance in the material compacts, and the region adjacent to the compacts is maintained at a high reducing atmosphere due to the self-shielding effect. However, during the latter stage of the solid reduction and during the subsequent carburization and melting period, the amount of the CO gas produced drastically decreases. Thus, prevention of reoxidation due to the self-shielding effect cannot be expected.

Figure 5:
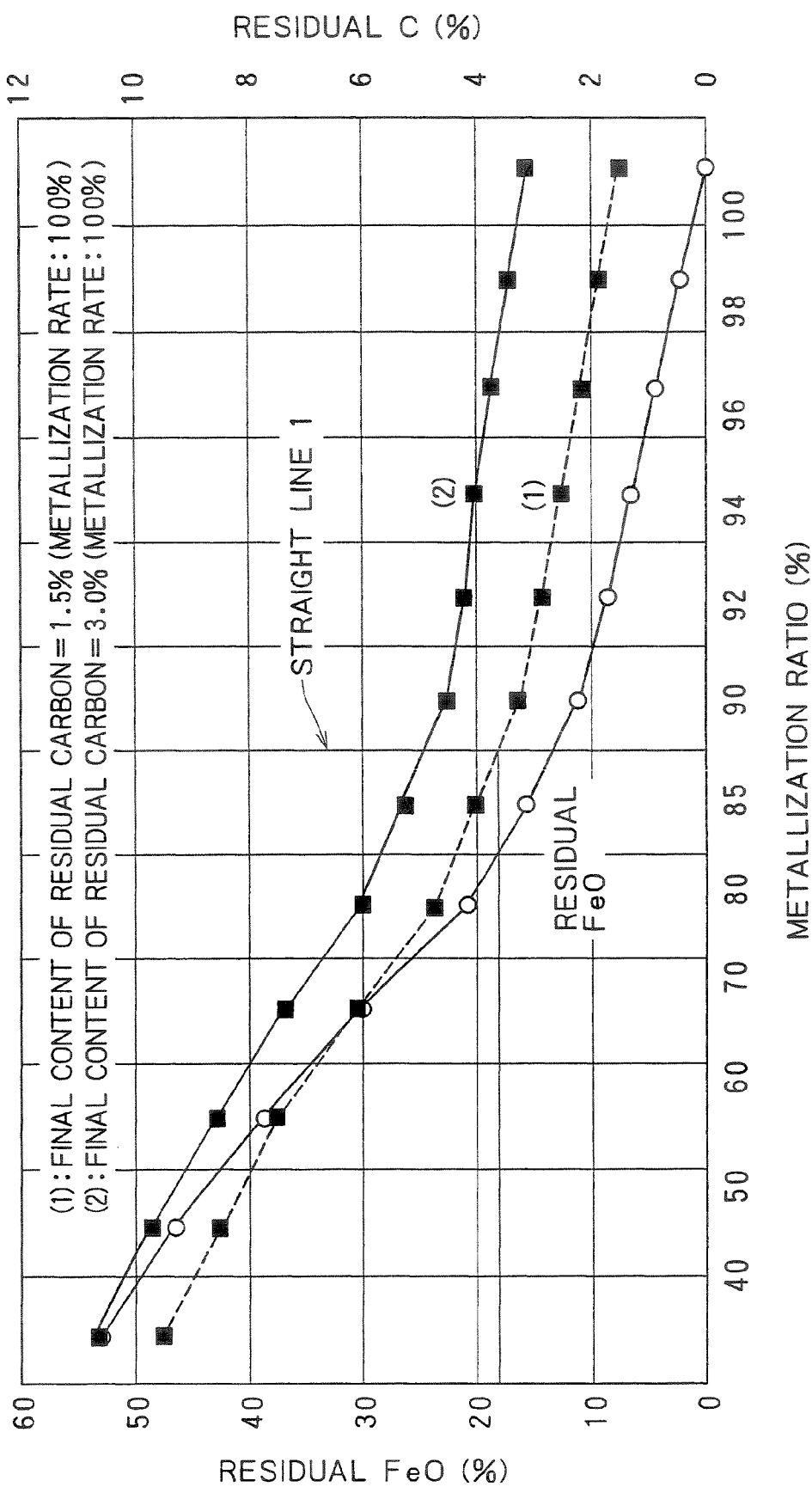
FIG. 5 is a graph showing the transitions of the residual Fe content and the metallization ratio of the metal oxide in the material compacts throughout the solid-reduction period and the melting period.

FIG. 5 shows results of examination on the relationship among the metallization ratio, the residual FeO, and the residual carbon in the resulting material of the solid reduction. As shown in the graph, FeO decreases as solid reduction progresses, that is, as the metallization ratio increases. Up to straight line 1 in the graph, solid reduction of the material compacts progresses inside the furnace controlled at a temperature of 1,200 to 1,500° C. Subsequently, carburization, melting, and cohesion of the reduced iron progress during the melting period in which the temperature is controlled in the range of 1,350 to 1,500° C. in a highly reducing atmosphere. During this period, the relationship among the metallization ratio, the residual FeO and the residual carbon changes as shown by the portions of the curves included in the right section of the graph from the straight line 1.

Curves (1) and (2) in FIG. 5 show the relationship between the metallization ratio and the residual carbon content. The curve (1) is when the residual carbon content is 1.5% when the metallization ratio is 100%. The curve (2) is when the residual carbon content is 3.0% when the metallization ratio is 100%. In order to obtain the metallic iron nuggets of the present invention, the amount of the carbonaceous substance is preferably controlled during the process of making material compacts so that the residual carbon content is above the curve (1).

Note that even when a predetermined amount of the carbonaceous substance is used in making material compacts, the residual carbon content at the metallization ratio of 100% slightly varies depending on the reducing degree of the atmosphere gas inside the furnace. Accordingly, the amount of the carbonaceous substance should be suitably adjusted according to the reducing degree of the atmosphere gas used in the operation. In any case, the initial amount of the carbonaceous substance is preferably adjusted so that the final residual carbon content is 1.5% or more at a metallization ratio of 100%.

Figure 6:
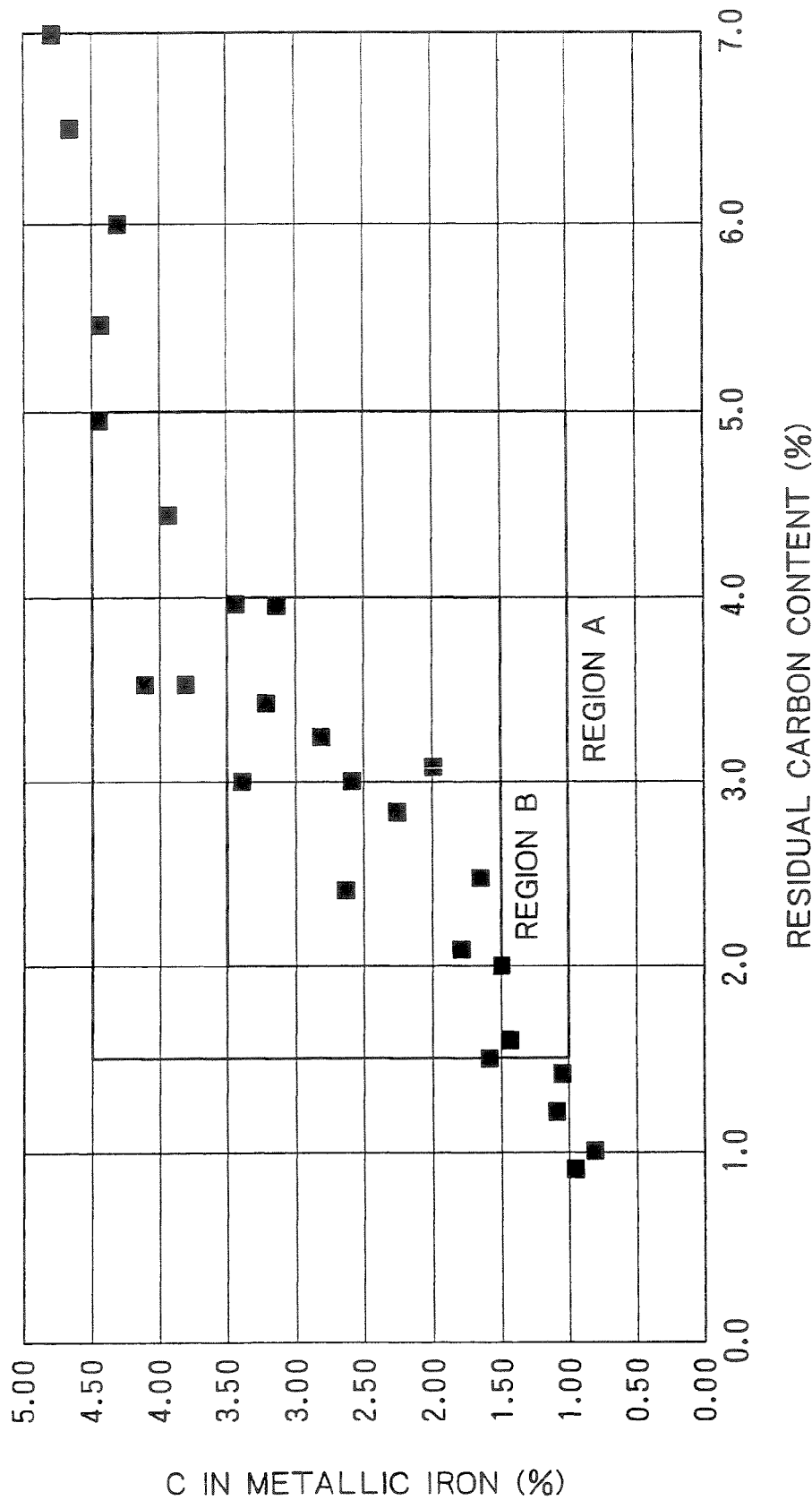
FIG. 6 is a graph showing the relationship between the residual carbon content in the reduced iron when the metallization ratio is 100% and the residual carbon content of the end product metallic iron nuggets.

FIG. 6 shows the results of the examination on the relationship between the residual carbon content at a metallization ratio of 100% and the C content of the resulting metallic iron nuggets. When the residual carbon content is 1.5 to 5.0%, the resulting metallic iron nuggets can securely have a C content of 1.0 to 4.5%. When the residual carbon content is 2.5 to 4.5%, the resulting metallic iron nuggets can securely have a C content of 2.0 to 4.0%.

Figure 7:
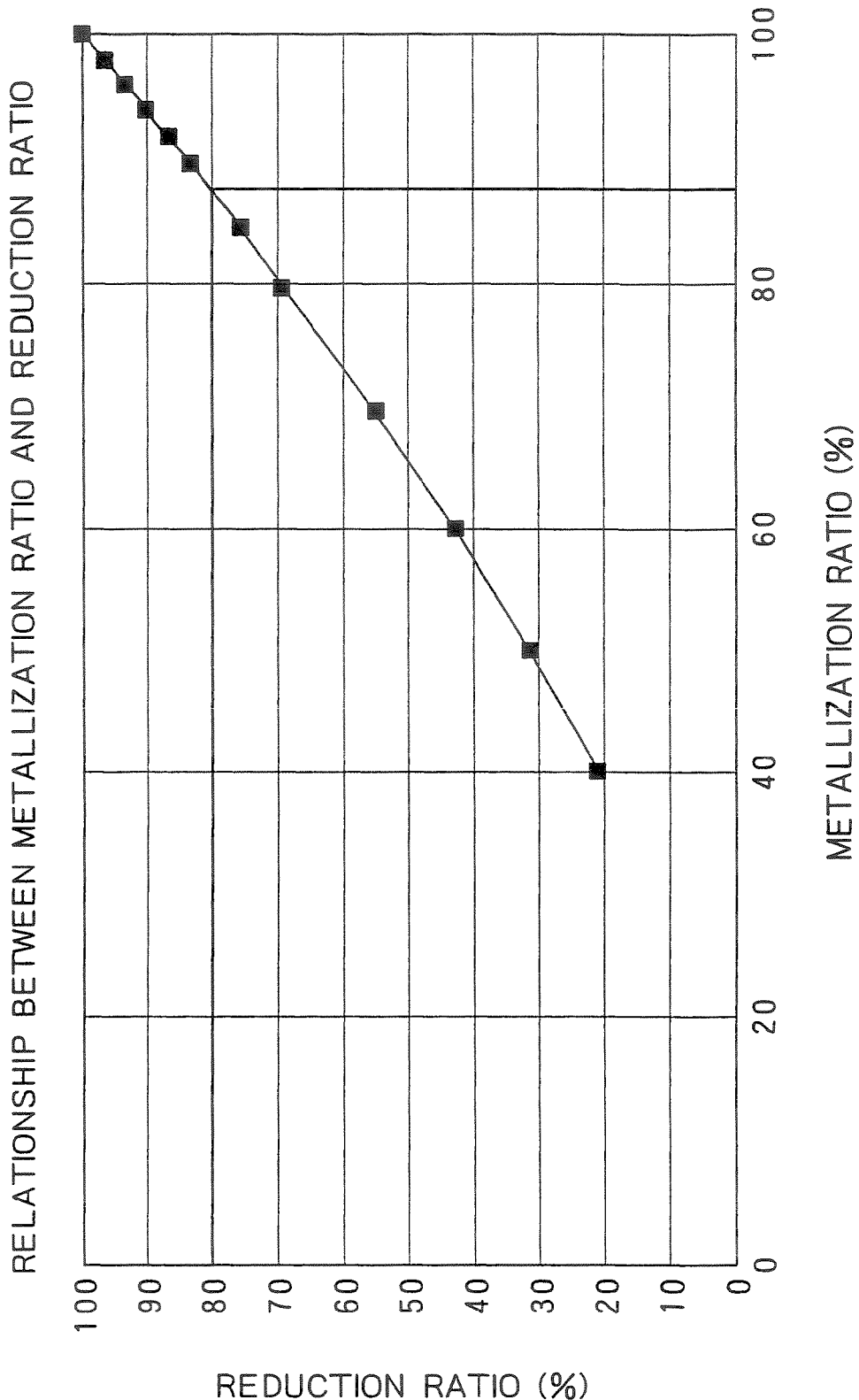
FIG. 7 is a graph showing the relationship between the metallization ratio and the reducing degree.

In the description above, two indices, i.e., the metallization ratio and the reduction ratio, are used to indicate the state of FeO reduction. The definitions of the metallization ratio and the reduction ratio are described below. The relationship between the two is, for example, shown in FIG. 7. The relationship between the two changes depending on the type of the iron ore used as an iron oxide source. FIG. 7 shows the relationship between two when magnetite ($Fe_3O_4$) is used as an iron oxide source.

Metallization ratio=[metallic iron nuggets produced/
(metallic iron nuggets produced+iron in iron ore)]×100 (%)

Reduction ratio=[amount of oxygen removed during the reduction process/amount of oxygen in the iron oxide contained in the material compacts]× 100 (%)

The reducing-melt furnace used in making the metallic iron nuggets of the present invention employs burners to heat the material compacts, as described above. During the solid-reduction period, as described above with reference to FIG. 4, the iron oxide source and the carbonaceous substance in the material compacts fed into the furnace react with each other to produce a large amount of CO gas and a small amount of $CO_2$ gas. Accordingly, the region adjacent to the material compacts is maintained at a sufficient reducing atmosphere as a result of the shielding effect of the CO gas emitted from the material compacts themselves.

However, during the latter stage and the final stage of the solid reduction period, the amount of the CO gas decreases rapidly, resulting in a decrease in the self-shielding effect. Accordingly, the reduced iron becomes vulnerable to the exhaust gas, i.e., an oxidizing gas such as $CO_2$ and $H_2O$, produced by burner heating, and reoxidation of the reduced metallic iron may occur. Moreover, after completion of the solid reduction, melting and cohesion of the minute particles of reduced iron progress due to the carburization of the reduced iron using the residual carbon in the compacts and a decrease in the melting temperature resulting from the carburization. During this stage also, since the self-shielding effect is poor, the reoxidation of the reduced iron may readily occur.

In order to efficiently perform carburization, melting, and cohesion after the solid reduction to secure an Fe purity of 94% or more and to thereby obtain metallic iron nuggets of a suitable diameter while preventing a decrease in the Fe purity resulting from such reoxidation as much as is feasibly possible, the composition of the atmosphere gas in the carburization and melting regions is preferably optimized.

In view of the above, the examination of atmosphere conditions for efficiently performing carburization and melting while preventing the reoxidation of the reduced iron during the carburization and melting period after completion of the solid reduction was conducted. The results of the examination will now be described with reference to FIG. 8. In the experiments, a box furnace was used, and coal powder was used as an atmosphere adjustor during the carburization and melting stage. On a hearth, a coal powder was bed to an adequate thickness so as to keep a highly reducing atmosphere during the carburization and melting.

In particular, coal powders having different particle diameters were used as atmosphere adjustors. The coal powder was bedded to a thickness of approximately 3 mm on an alumina tray, and 50 to 60 material compacts having a diameter of approximately 19 mm were placed on the bed of the coal powder. A thermocouple was provided to one of the material compacts. The material compacts were fed into the box furnace. The temperature of the composite during heating was measured, and the composition of the gas produced was measured to determine the possibility of the reoxidation of the produced metallic iron. Note that the temperature inside the electric furnace was adjusted so that the maximum furnace temperature is approximately 1,450° C. The initial composition of the atmosphere gas inside the furnace was $CO_2$: 20% and $N_2$:80%.

Figure 8:
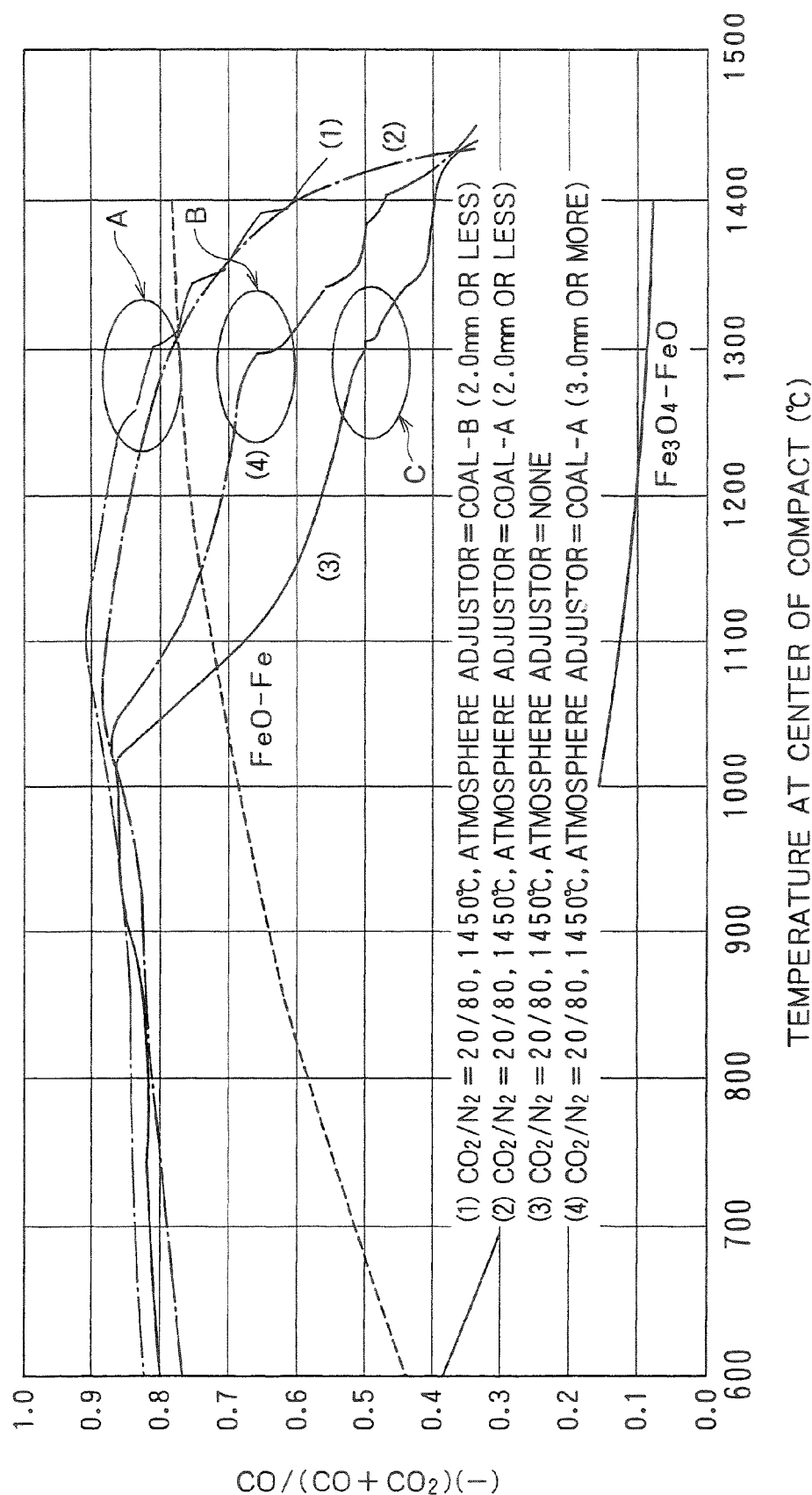
FIG. 8 is a graph showing a change in the reducing degree of an atmosphere gas and in the temperature of the interior of the material compacts when a coal powder is used as an atmosphere adjustor and when the coal powder is not used as an atmosphere adjustor.

FIG. 8 shows the results of the experiments in which the temperature of the material compacts detected by the thermocouple described above and the composition of the atmosphere gas when the temperature inside the electric furnace is gradually elevated were measured over time. The horizontal axis shows changes in temperature, and the vertical axis shows a simplified reducing degree $(CO)/(CO+CO_2)$ of the atmosphere gas. In the graph, four experimental results are plotted. Curve (3) shows the result of the experiment where no atmosphere adjustor was used. Curve (4) shows the result of the experiment where a coarse coal powder having an average diameter exceeding 3.0 mm was used as an atmosphere adjustor. Curves (1) and (2) show the results of the experiments where fine coal powders A and B having a diameter of 2.0 mm or less were used. In the graph, an FeO—Fe equilibrium curve and an $Fe_3O_4$—FeO equilibrium curve are also included. The circled regions indicate periods during which the solid reduction nearly completes and the carburization, melting, and cohesion of the reduced iron begin in these experiments. The control of the atmosphere gas during these periods is particularly important for preventing reoxidation of the iron oxide and for obtaining metallic iron nuggets of a high Fe purity.

As is apparent from this graph, the curve (3) of the experiment where no atmosphere adjustor was used, the region C indicating the beginning of the carburization, melting, and cohesion of the reduced iron, was far below the FeO—Fe equilibrium curve. This demonstrates that the entire reduced iron melted while a portion thereof underwent the reducing-melt. The metallic iron was still obtained in this experiment, but, as described above, when reducing-melt occurs, the resulting iron is likely to be sponge-shaped and is thus easy to make nuggets therefrom. Moreover, the Fe purity of the metallic iron was insufficient.

In contrast, the curves (1) and (2) show the results of the experiments in which fine coal powder was used. As is apparent from the graph, the reducing degree of the atmosphere gas was significantly improved. Moreover, the region A in which the carburization, melting, and cohesion of the reduced iron occurred was above the FeO—Fe equilibrium curve, meaning that the generation of FeO was prevented in these experiments. The curve (3) shows the results of the experiment using a coarse coal powder. In this experiment, the region B in which the carburization, melting, and cohesion of the reduced iron occurred was slightly below the FeO—Fe equilibrium curve. This means some degree of reoxidation might have occurred. However, the composition of the produced metallic iron was examined, and the results confirmed that substantially no reoxidation occurred in this experiment.

It was also confirmed that the metallic iron nuggets having an Fe content of 94% or more and a carbon content of 1.0 to 4.5% can be highly effectively manufactured by controlling the reducing degree of the atmosphere gas to at least 0.5, more preferably, at least 0.6, yet more preferably, at least 0.7, and most preferably above the FeO—Fe equilibrium curve, at least during the beginning stage of the carburization, melting, and cohesion period. In this manner, carburization, melting, and cohesion can be smoothly performed without allowing the reoxidation of the reduced iron produced by solid reduction.

Direct analysis of the experimental data shown in FIG. 8 suggests that a substantial degree of reoxidation may occur at a simplified reducing degree of 0.5 to 0.7. However, this experiment examines the reoxidation degree of the atmosphere gas only; the inner portions of the actual material compacts or the atmosphere near the actual material compacts are maintained at a highly reducing atmosphere because of the presence of the residual carbon inside the material compacts and the atmosphere adjustor. Moreover, an oxidizing gas such as $CO_2$ and $H_2O$ in the atmosphere of the upper portion of the hearth is readily reduced by the carbonaceous atmosphere adjustor when the oxidizing gas enters the section near the material compacts. Thus, it is assumed that no reoxidation occurs even when the measured reducing degree of the atmosphere is 0.5 to 0.7. Note that at a reducing degree of less than 0.5, the produced metallic iron is readily reoxidized, cohesion of the metallic iron and formation of metallic iron nuggets become difficult due to insufficient carburization, and metallic iron nuggets having a diameter in the range of the present invention are difficult to obtain.

After carburization, melting, and cohesion of the reduced iron are completed, the reducing degree of the atmosphere gas decreases rapidly. However, in actual operation, the metallic iron, which has been melted and cohered, is nearly completely separated from the by-product slag by this time. Thus, the metallic iron is hardly affected by the atmosphere gas, and metallic iron nuggets having a high Fe content and a low inclusion slag content can be effectively made by cooling and solidifying this metallic iron.

As is apparent from above, a coal powder used as an atmosphere adjustor is preferably pulverized to a diameter of 3 mm or less, and more preferably, 2 mm or less to further reliably prevent the reoxidation during carburization, melting, and cohesion. In view of the yield and operation of the furnace in actual operation, the diameter of the coal powder is most preferably in the range of 0.3 to 1.5 mm. No limit is imposed as to the thickness at which the coal powder is bedded, but the thickness of the coal powder bed is preferably approximately 2 mm or more, and more preferably 3 mm or more since the amount of the coal powder as the atmosphere adjustor is insufficient at an excessive small thickness. No limit is imposed as to the upper limit of the thickness. However, since the atmosphere adjusting effect saturates at an excessively large thickness, it is practical and cost-effective to restrict the thickness to preferably approximately 7 mm or less, and more preferably, approximately 6 mm or less. Any material can be used as an atmosphere adjustor as long as it releases CO. Examples of such materials include coal, coke, and charcoal. These materials may be used alone or in combination.

The atmosphere adjustor may be bedded on a hearth before the material compacts are fed on a hearth. In such a case, the atmosphere adjustor also functions to protect the hearth refractory from the slag bleeding during the reducing-melt process. However, since the atmosphere adjustor exerts its effect during the carburization, melting, and cohesion period after the solid reduction, it is also effective to sprinkle the atmosphere adjustor from above the hearth immediately before the carburization and melting of the material compacts begin.

According to the above method, the reoxidation of the reduced iron can be prevented and carburization, melting, and formation of nuggets can be effectively performed since the reducing degree of the atmosphere gas during the carburization and melting period is enhanced. Thus, metallic iron nuggets having a high Fe content and a suitable size can be efficiently manufactured. During the process, in order to effectively perform a series of steps from solid reduction to the carburization, melting, and cohesion, the temperature and the atmosphere gas are preferably separately controlled according to the step. In particular, the temperature during the solid reduction period is preferably 1,200 to 1,400° C. to prevent reducing-melt reaction, as described above. The temperature during the carburization, melting, and cohesion period is preferably 1,300 to 1,500° C. More preferably, the temperature during the solid reduction period is 50 to 200° C. lower than the temperature during the carburization, melting, and cohesion period.

As for the atmosphere gas conditions, since a large amount of CO gas that is produced by the burning of the carbonaceous substance inside the material compacts maintains a highly reducing atmosphere during the solid reduction period, the atmosphere gas inside the furnace does not require extensive control. In contrast, during the carburization, melting, and cohesion period, emission of the CO gas from the material compacts drastically decreases. As a result, reoxidation caused by the oxidizing gas produced by the combustion of the burners may readily occur. Thus, in order to obtain metallic iron nuggets having an adequate carbon content, it is essential to suitably adjust the atmosphere gas inside the furnace from this period on. The atmosphere gas can be adjusted by using an atmosphere adjustor, for example.

In order to suitably adjust the temperature and the atmosphere gas composition inside the furnace according to the progress of the reducing-melt, the reducing-melt furnace is preferably divided into at least two zones in the traveling direction of the hearth by using a partition, as shown in FIGS. 1-3. Preferably, the upstream zone is configured as a solid reduction zone, and the downstream zone is configured as a carburization, melting, and cohesion zone so as to separately control the temperature and the atmosphere gas composition of each zone. Note that FIG. 3 shows as example in which the furnace is divided into four zones using three partitions to allow more stringent control of the temperature and the atmosphere gas composition. The number of zones can be adjusted to suit the scale and the structure of the reducing-melt facility.

The metallic iron nuggets of the present invention made by the above-described process contain substantially no slag component and have an Fe purity of 94% or more, and more preferably 96% or more, and a carbon content of 1.0 to 4.5%. The diameter thereof is in the range of 1 to 30 mm. These metallic iron nuggets are used as an iron source in known facilities for steelmaking, such as a electric furnace and a converter. When using the metallic iron nuggets as a material for steelmaking, the sulfur content therein is preferably as low as is feasibly possible. The investigation has been conducted to remove sulfur contained in the iron ore and the carbonaceous substance as much as possible during the process of making the metallic iron nuggets and to obtain metallic iron nuggets having a low sulfur content.

As a result, it has been found that the sulfur content in the end-product metallic iron nuggets can be reduced to 0.08% or less by intentionally adding a CaO source, e.g., burnt lime, slaked lime, or calcium carbonate, during making the material compacts using the iron ore and the carbonaceous substance so as to adjust the basicity (i.e., the ratio of $CaO/SiO_2$) of the overall slag components contained in the material compacts to 0.6 to 1.8, and more preferably 0.9 to 1.5, the overall slag components including the gangue component in the iron ore, etc.

Note that coke or coal, which is the most commonly used carbonaceous reductant, normally contains approximately 0.2 to 1.0% of sulfur. The majority of sulfur contained therein is captured in the metallic iron. If basicity adjustment intentionally using a CaO source is not performed, the basicity calculated based on the slag composition in the material compacts is usually 0.3 or less, although the basicity significantly varies according to the type of iron ore. In slag having such a low basicity, sulfur cannot be prevented from becoming mixed into the metallic iron during the solid reduction process or the subsequent process of carburization, melting, and cohesion. Approximately 85% of total sulfur in the material compacts will be included in the metallic iron. As a result, the sulfur content of the metallic iron nuggets is increased, and the quality of the end-product metallic iron is degraded.

It was confirmed that by intentionally adding a CaO source during the step of making material compacts so as to adjust the composition of the slag component to exhibit a basicity of 0.6 to 1.8, sulfur can be fixed in the by-product slag which is produced during solid reduction and carburization, melting, and cohesion. As a result, the sulfur content in the metallic iron nuggets can be dramatically reduced.

The sulfur content reduction is considered to occur when sulfur contained in the material compacts is allow to react with CaO and is thus fixed as CaS (CaO+S=CaS). Conventionally, when the above-described reducing-melt mechanism was not clearly known, it was considered that desulfurization effect comparable to that of a hot metal desulfurization cannot be achieved by the addition of CaO. However, the inventors have confirmed that CaO in the slag captures sulfur when the reduced iron melts, forms nuggets, and becomes separated from the slag due to the carburization caused by the residual carbon inside the reduced metal, and thus the sulfur content in the resulting metallic iron nuggets can be dramatically decreased.

Figure 9:
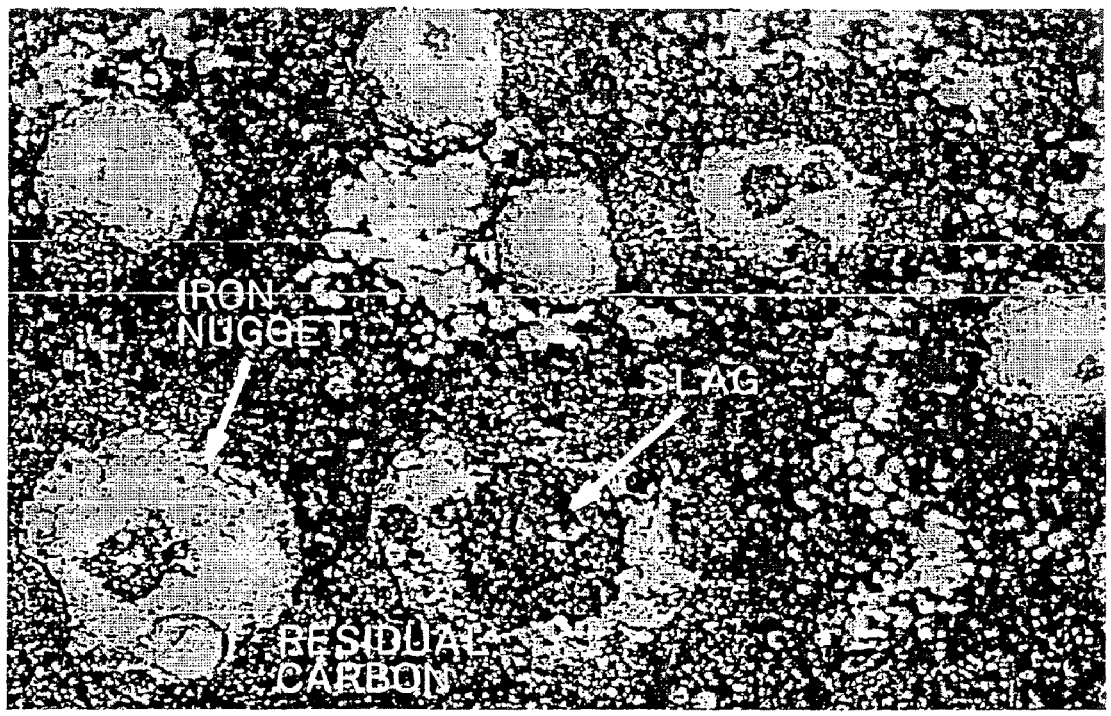
FIG. 9 is a photograph showing the state of metallic iron and slag immediately after carburization and melting obtained by a manufacturing experiment.

Such a sulfur reduction mechanism is different from a normal hot metal desulfurization using CaO-containing slag and is considered as a reaction unique to the above-described process. Of course, if carburized and melted reduced iron is sufficiently put into contact with the by-product molten slag under appropriate heating conditions, a liquid-liquid (molten iron-molten slag) reaction may determine the ratio of the S content in the slag (S %) to the S content in the metallic iron nuggets [S %], i.e., the distribution ratio of sulfur (S %)/[S %]. However, as can be confirmed by the photograph shown in FIG. 9, the slag-metal contact area of the produced molten iron and the molten slag is small. Thus, a large sulfur reduction cannot be expected from the slag-metal equilibrium reaction after the reduced iron is carburized, melted, and cohered. Accordingly, it can be assumed that the desulfurization mechanism of intentionally adding CaO into the material compacts employed in the above process includes a sulfur trapping reaction peculiar to CaO during carburization, melting, and cohesion of reduced iron, the sulfur trapping reaction preventing the sulfurization of the metallic iron nuggets.

The amount of the CaO added to adjust the basicity should be determined based on the amount and the composition of the gangue component contained in iron ore or the like and on the type and the amount of the carbonaceous substance added to the material. A standard amount of CaO required to adjust the basicity of the overall slag component in the above-described range of 0.6 to 1.8 is, in terms of pure CaO, 2.0 to 7.0%, and more preferably 3.0 to 5.0%, of CaO in the entirety of the composites. When slaked lime $[Ca(OH)_2]$ or calcium carbonate $(CaCO_3)$ is used, the amount thereof should be converted to CaO. It was confirmed that then 4% $CaCO_3$ was contained in the material compacts to adjust the basicity of the slag component to approximately 0.9 to 1.1, an apparent desulfurization ratio of 45 to 50% was obtained. The apparent desulfurization ratio was determined by the equation below. When 6% $CaCO_3$ was contained in the material compacts to adjust the basicity of the slag component to approximately 1.2 to 1.5, an apparent desulfurization ratio of 70 to 80% was obtained.

> Apparent desulfurization ratio (%)=[S content (%) in the metallic iron nuggets made from CaO-added material compacts/S content (%) in the metallic iron nuggets made from material compacts not using an additive CaO]×100.

Figure 10:
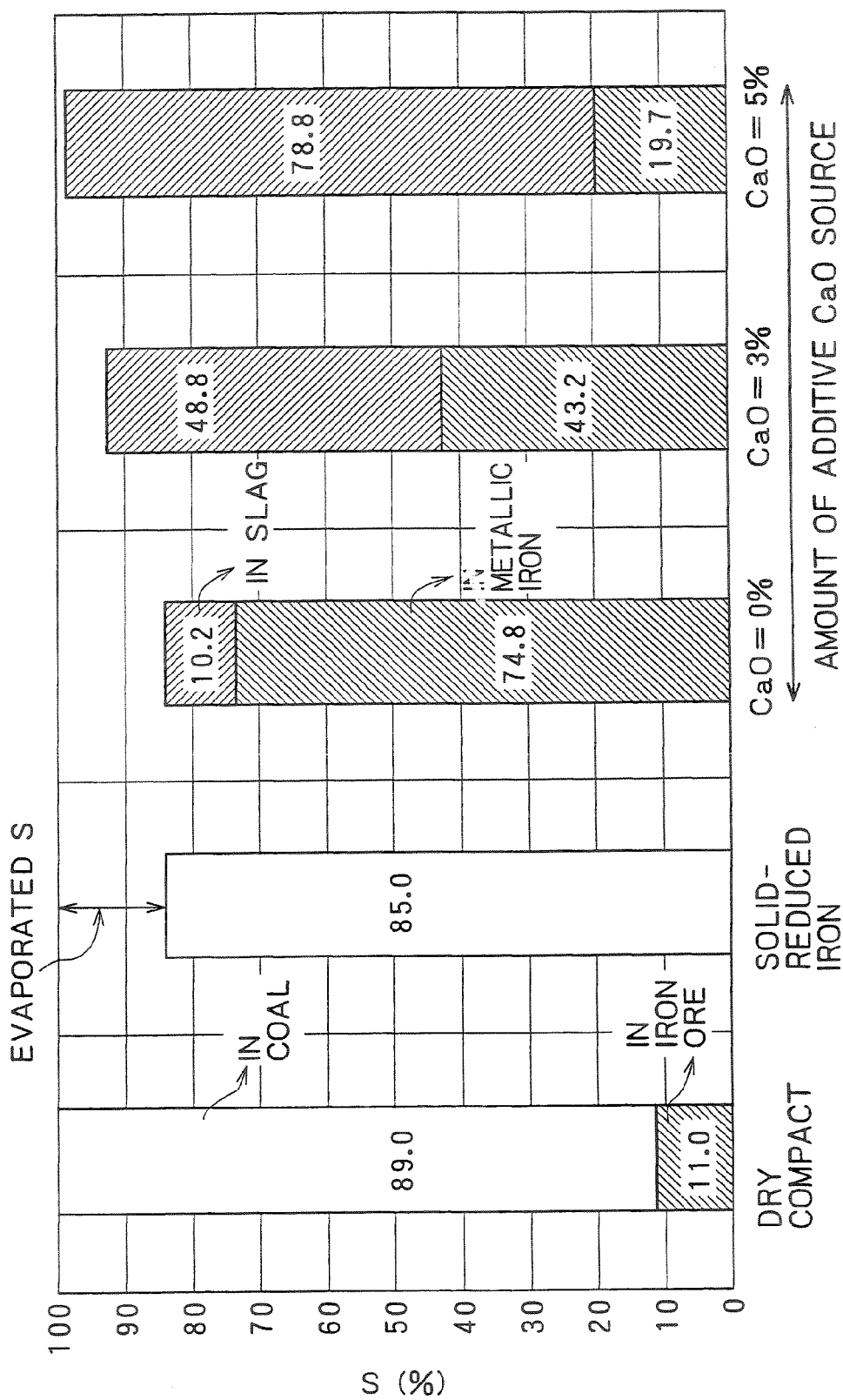
FIG. 10 is an experimental graph demonstrating that the sulfur content of the metallic iron nuggets can be decreased by adjusting the basicity of the slag by intentionally adding a CaO source to material compacts.

The effect of adding a CaO source to the material on reduction of sulfur will now be described based on experimental data taken using a box furnace. FIG. 10 shows changes in sulfur content when reducing-melt is performed as described above using iron ore, a carbonaceous substance, a small amount of binder (bentonite, or the like), and an adequate amount of CaO.

In FIG. 10, "dry compact" shows that, of 100% sulfur contained in the material before reducing-melt, approximately 89% was contained in the carbonaceous substance (coal) and approximately 11% was contained in the iron ore. When the compacts were subjected to reducing-melt, approximately 85% of sulfur remained in the reduced iron upon completion of the solid reduction explained above with reference to FIG. 4. Approximately 12% of sulfur evaporated and was discharged from the furnace. When compacts containing no additive CaO source (the calculated basicity of the slag component in the composite being 0.165) were used, 74.8% of sulfur was trapped in the end-product metallic iron nuggets, and 10.2% of sulfur was trapped in the slag.

When material compacts having their basicity of the slag component adjusted to 1.15 by adding 3% of a CaO source were used, the amount of sulfur captured in the metallic iron nuggets decreased to 43.2%, and the amount of sulfur trapped in the slag was increased to 48.8%. The amount of sulfur evaporated and discharged outside the furnace during the manufacturing process reduced to approximately 8%. When material compacts having their basicity of the slag component adjusted to 1.35 were used by adding 5% of a CaO source, the amount of sulfur captured in the metallic iron nuggets decreased to 18.7%, and the amount of sulfur trapped in the slag was increased to 78.8%. The amount of sulfur evaporated and discharged outside the furnace during the manufacturing process was reduced to 1.5%.

Figure 11:
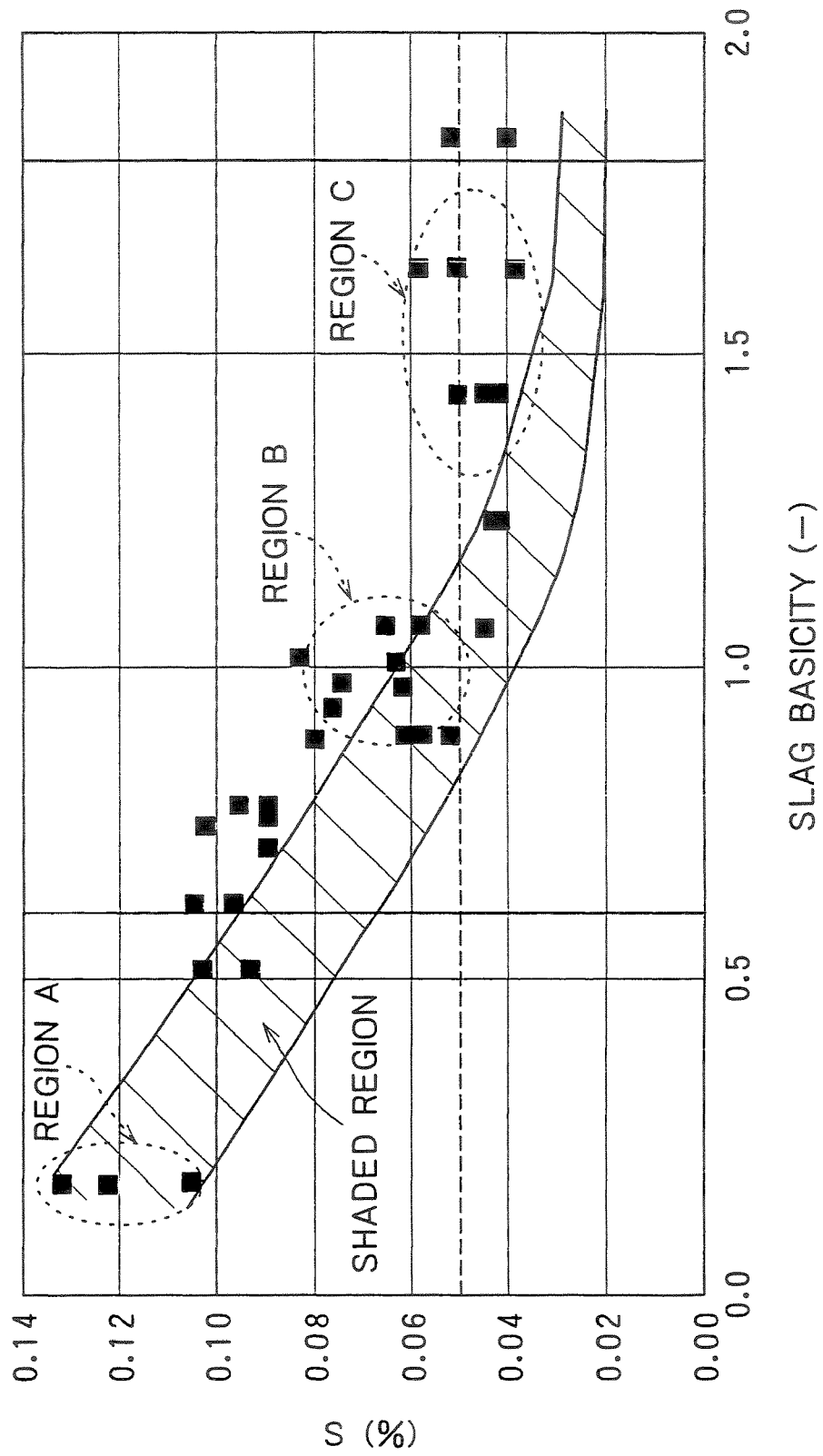
FIG. 11 is a graph showing the relationship between the sulfur content of the metallic iron nuggets and the basicity of the product slag.

The above basic experiments using a box furnace demonstrated that the basicity adjustment by adding a CaO source was particularly effective in reducing the amount of sulfur contained in the metallic iron. The same experiment was conducted using a demonstration reactor. In the experiment, the effect of the basicity on the sulfur reduction of the metallic iron nuggets was quantitatively examined by varying the amount of the CaO source to yield different slag basicities. The results are shown in FIG. 11.

This graph illustrates the relationship between the final basicity of the slag and the sulfur content in the metallic iron nuggets. In the experiment, the slag was produced while varying the amount of the CaO source, and each of the points in the graph shows an actual result. The shaded region in the graph shows the results of the above-described basic experiments using a box furnace. Since the basic experiments employed an electrical heating method and used an inert gas as an atmosphere gas, the oxidation potential of the atmosphere was low, which advantageously affects the apparent desulfurization ratio. In contrast, the demonstration furnace employed burner combustion, and thus the reducing degree of the atmosphere gas was low due to the generation of combustion gas compared to that of the basic experiments. The sulfur content in the metallic iron nuggets was higher than the results of the basic experiments. However, the basic tendency was substantially the same as that shown by the results of the basic experiments. It could be confirmed that when no CaO source was added, the sulfur content in the metallic iron nuggets in the region A was approximately 0.12%. When the basicity was adjusted to approximately 1.0, the S content was reduced to 0.05 to 0.08%, as shown in region B, and the apparent desulfurization ratio was approximately 33 to 58%. When the basicity was increased to 1.5, the sulfur content in the metallic iron was reduced to approximately 0.05%, as shown in region C.

When a CaO source is added to increase the basicity of the slag to 1.8 or more, the melting point of the produced slag increases, and the operating temperature must thus be increased to an excessively high level. As a result, the damage on the furnace is accelerated, and the heat economy is degraded. Moreover, the cohesion property of the reduced iron is degraded, and the resulting metallic iron is obtained as minute particles smaller than 1 mm having a low product value.

As is apparent from these experiments when an adequate amount of a CaO source is intentionally added to the material compacts to increase the basicity of the slag component to approximately 0.6 or more, the produced slag captures a significantly larger amount of sulfur, and the amount of the sulfur captured in the metallic iron nuggets can thus be significantly reduced. As a result, metallic iron nuggets that satisfy the level of the sulfur content required in the present invention, i.e., metallic iron nuggets having a sulfur content of 0.08% or less, can be easily manufactured. Furthermore, as described above with reference to FIG. 10, the amount of sulfur discharged outside the furnace as $SO_x$ or the like during a series of metallic iron nuggets manufacturing steps can be drastically reduced. Thus, air pollution due to effluent gas can be minimized. Moreover, load of desulfurizing the effluent gas can be significantly reduced if desulfurization treatment of the effluent gas is performed.

When the CaO source is added to reduce the S content, as described above, bleeding of low-melting point slag which leads to dissolution of the hearth refractories may occur during the reducing-melt period due to a decrease in the melting point of the by-product slag depending on the amount of the CaO source added. In implementing the above-described process, a two-stage heating method including a solid reduction period and a carburization, melting, and cohesion period is preferably performed. During the solid-reduction period, the temperature is preferably adjusted to 1,200 to 1,400° C., and during the carburization, melting, and cohesion period, the temperature is preferably adjusted to 1,350 to 1,500° C. In this manner, the solid reduction can be sufficiently performed below the melting point of the by-product slag, and, subsequently, the reduction of the remaining FeO, and carburization, melting, and cohesion of the reduced iron can be performed to minimize undesirable bleeding of the by-product slag.

In making metallic iron by first solid-reducing material compacts containing iron ore and a carbonaceous substance and then carburizing, melting, and cohering the resultant material, the amount of the carbonaceous reductant in the material compacts, the temperature conditions during solid reduction, and the composition of the atmosphere gas and the temperature conditions during carburization and melting, and the like should be suitably adjusted. In this manner, reduction, carburization, melting, cohesion, and incorporation can be efficiently performed, and metallic iron nuggets having a high Fe purity, a suitable carbon content, and a suitable diameter can be obtained. Under these conditions, the resulting metallic iron nuggets have a Si content of 0.02 to 0.5%, and a Mn content of less than 0.3%. The sulfur content of the metallic iron nuggets can be reduced by intentionally adding CaO in the material compacts so as to adjust the basicity of the slag component.

The resulting metallic iron nuggets of the present invention have a high Fe purity, a suitable carbon content, a uniform shape, and a size of 1 to 30 mm. Thus the metallic iron nuggets of the present invention exhibit high handling quality and can thus effectively used as an iron source for making iron, steel, or various alloy steels.

EXAMPLES

The present invention will now be described in detail using examples. These examples do not limit the scope of the present invention. Various modifications are possible without departing from the scope of the invention described herein. These modifications are included in the technical scope of the present invention.

Example 1

Material compacts having a diameter of approximately 19 mm were made by uniformly mixing hematite ore, i.e., an iron source, coal, and a small amount of a binder (bentonite). Metallic iron was made using these material compacts. The material compacts were fed inside a reducing-melt furnace of a rotary hearth type shown in FIGS. 1 to 3, and solid reduction was performed at an atmosphere temperature of approximately 1,350° C. until a metallization ratio of approximately 90% was reached. Subsequently, the resulting material compacts were transferred to a carburization, melting, and cohesion zone at an atmosphere temperature of 1,440° C. so as to perform carburization, melting, and cohesion, and to separate by-product slag to make slag-free metallic iron nuggets.

Figure 12:
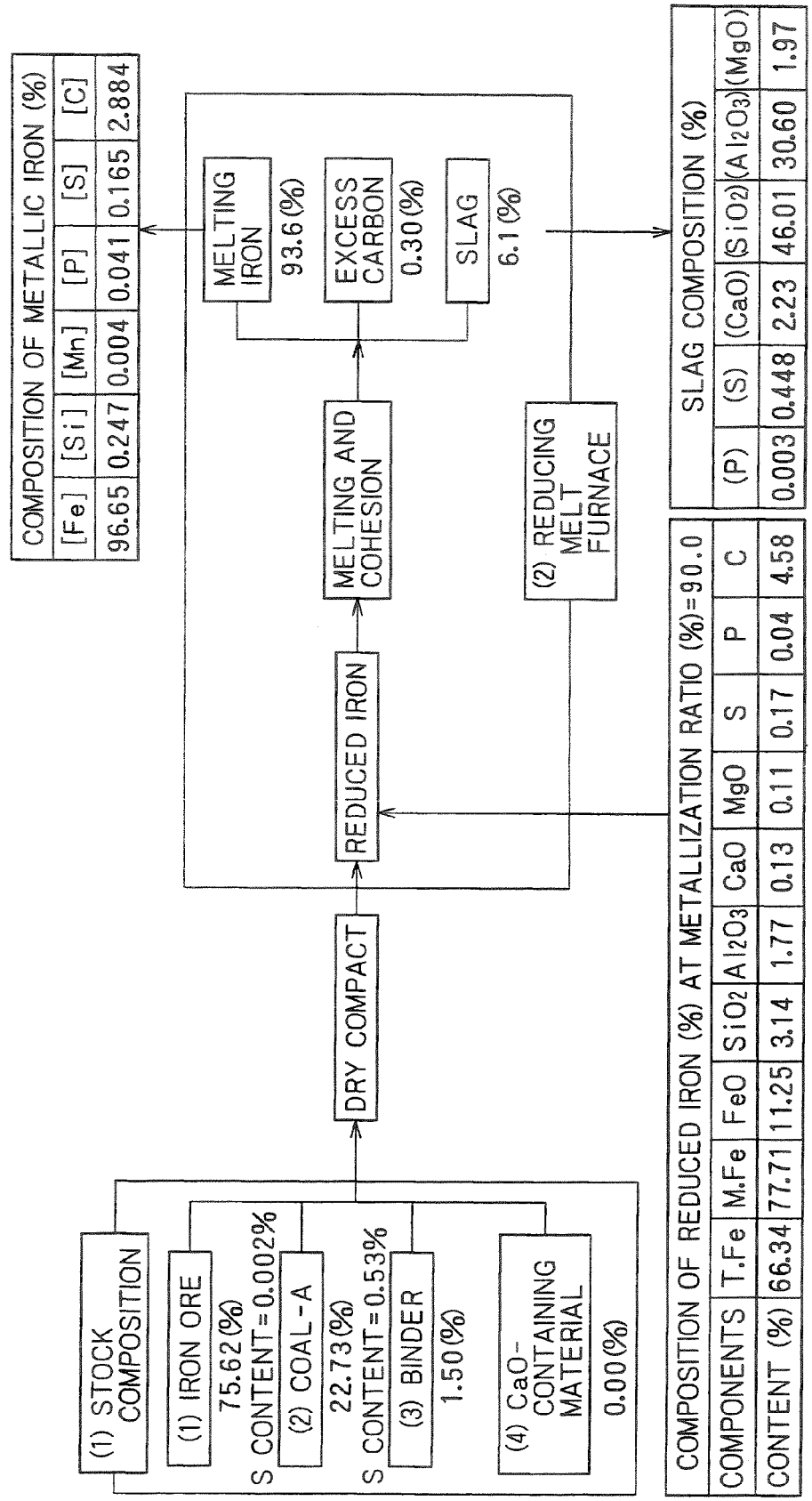
FIG. 12 is an explanatory diagram showing the composition of the material, and the ratio and the composition of the products such as metallic iron nuggets produced by a manufacturing process employed in Example.

In this process, coal powder, i.e., an atmosphere adjustor, having a diameter of 2 mm or less was bedded on a hearth to a thickness of approximately 5 mm before the material compacts were fed to the furnace so as to control the reducing degree of the atmosphere gas during the carburization, melting, and cohesion period in the range of 0.60 to 0.75. The material composition, the composition of the reduced iron after completion of solid reduction, the composition of the end-product metallic iron, the composition of the produced slag, etc., are shown in FIG. 12.

Figure 13:
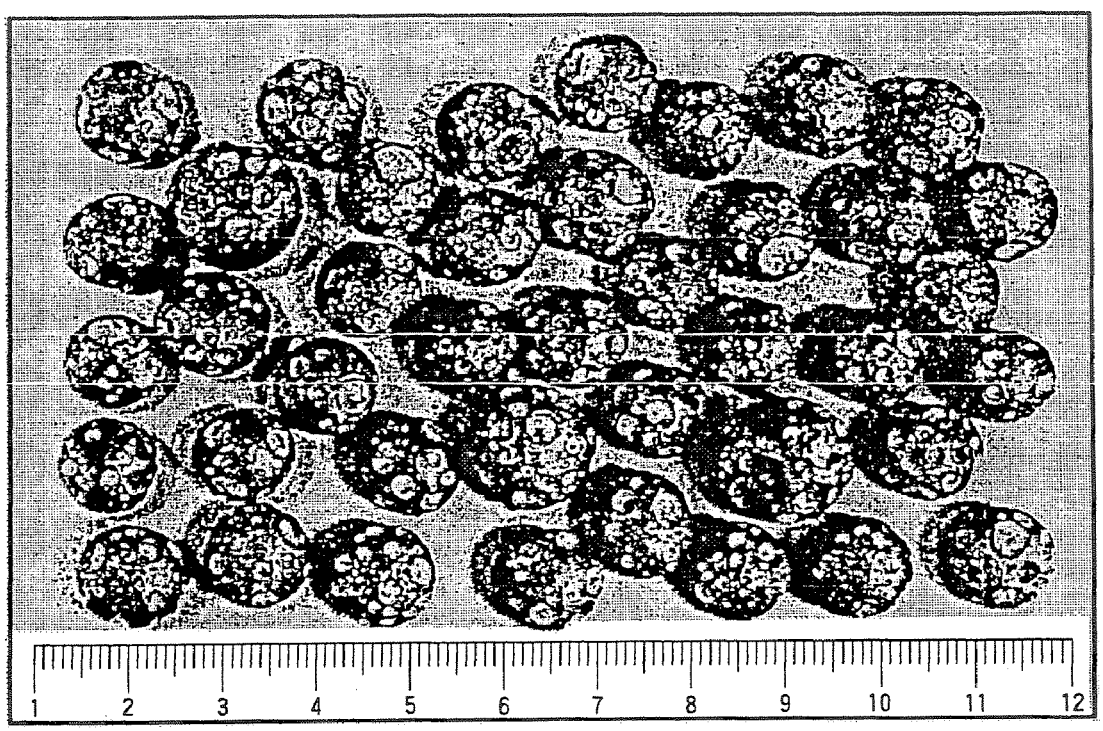
FIG. 13 is a photograph of metallic iron nuggets prepared in Example 1.

The metallic iron that had been melted, cohered, and substantially completely separated from the slag was then transferred to a cooling zone to be cooled to a temperature of 1,000° C. and solidified, and was discharged outside the furnace with a discharger. The production ratios and the compositions of the recovered metallic iron nuggets, the by-product slag, and the excess carbonaceous substance were analyzed. The reduced iron immediately before the carburization and melting was sampled from the reducing-melt furnace to analyze the composition of the reduced iron immediately before the carburization and melting. The results demonstrated that the metallization ratio was approximately 90%, and the residual carbon content was 4.58%. The time taken from feeding of the material compacts to discharging of the metallic iron was remarkably short, i.e., approximately 9 minutes. The resulting metallic iron had a carbon content of 2.88%, a Si content of 0.25%, and a S content of 0.165%. The resulting metallic iron could be easily separated from the by-product slag. A photograph of the produced metallic iron nuggets is shown in FIG. 13. The metallic iron nuggets had a diameter of about 10 mm and a substantially uniform size.

Example 2

Material compacts having a diameter of approximately 19 mm were made by uniformly mixing magnetite ore, i.e., an iron source, coal, a small amount of a binder (bentonite), and 5% of $CaCO_3$ as a slag basicity adjustor and forming the resulting mixture into compacts.

Figure 14:
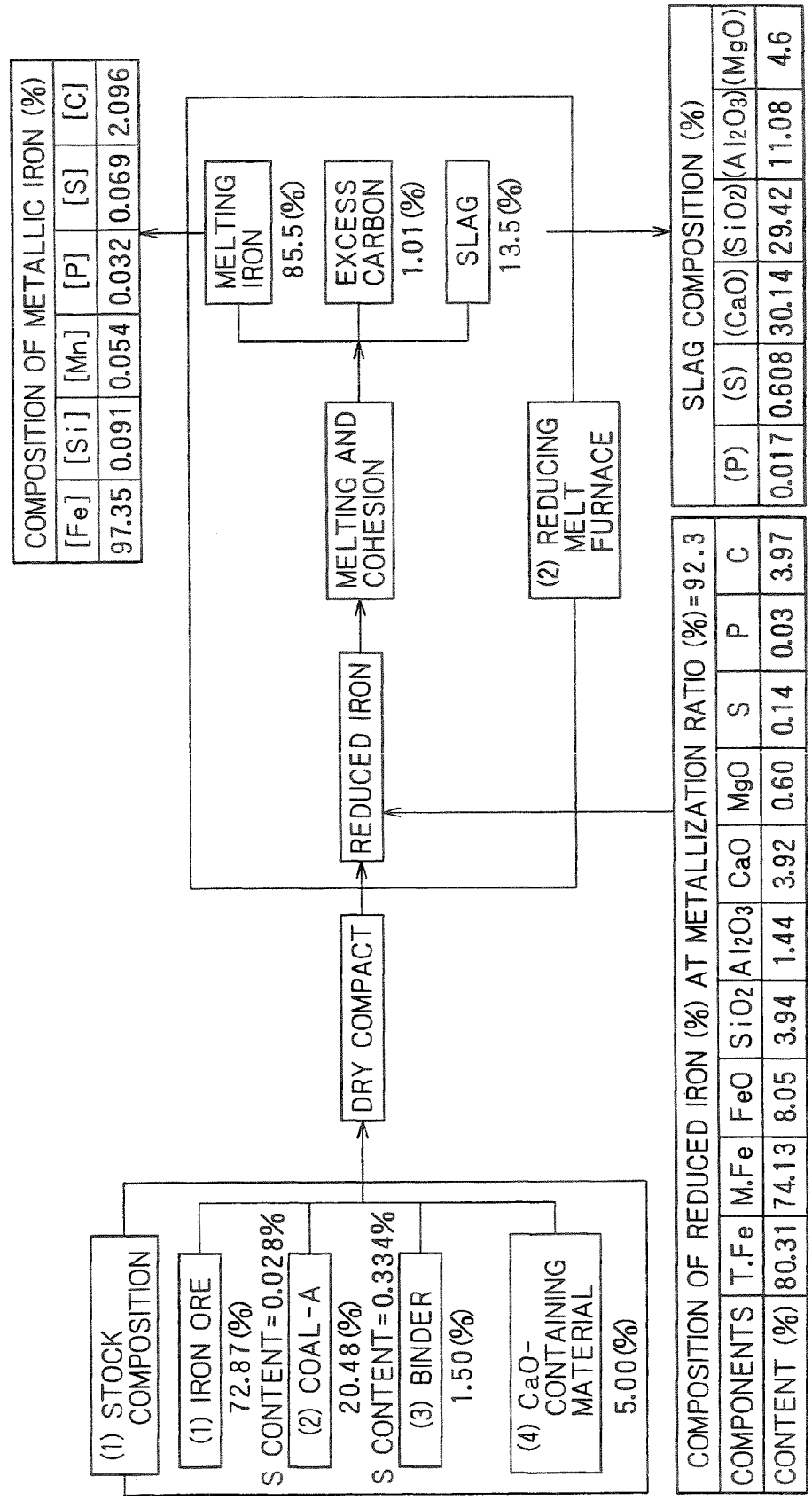
FIG. 14 is an explanatory diagram showing the composition of the material, and the ratio and the composition of the products such as metallic iron nuggets produced by a manufacturing process employed in another Example.

The material compacts were fed on a bed of coal powder (average diameter: approximately 3 mm) having a thickness of approximately 3 mm, the bed of coal powder being formed on a hearth. The coal powder was used as an atmosphere adjustor. The solid reduction was performed as in Example 1 while maintaining the atmosphere temperature at approximately 1,350° C. until the metallization ratio reached nearly 100%. Subsequently, the resulting material compacts were transferred to a melting zone maintained at 1,425° C. so as to perform carburization, melting, cohesion, and separation of by-product slag so as to make slag-free metallic iron. The material composition, the composition of the reduced iron after completion of solid reduction, the composition of the end-product metallic iron, the composition of the produced slag, etc., are shown in FIG. 14.

The metallic iron that had been melted, cohered, and substantially completely separated from the slag was then transferred to a cooling zone to be cooled to a temperature of 1,000° C. and solidified, and was discharged outside the furnace with a discharger. The production ratios and the compositions of the recovered metallic iron nuggets, the by-product slag, and the excess carbonaceous substance were analyzed. The reduced iron immediately before the carburization and melting was sampled from the reducing-melt furnace to analyze the composition of the reduced iron immediate before the carburization and melting. The results demonstrated that the metallization ratio was approximately 92.3%, and the residual carbon content was 3.97%.

Figure 15:
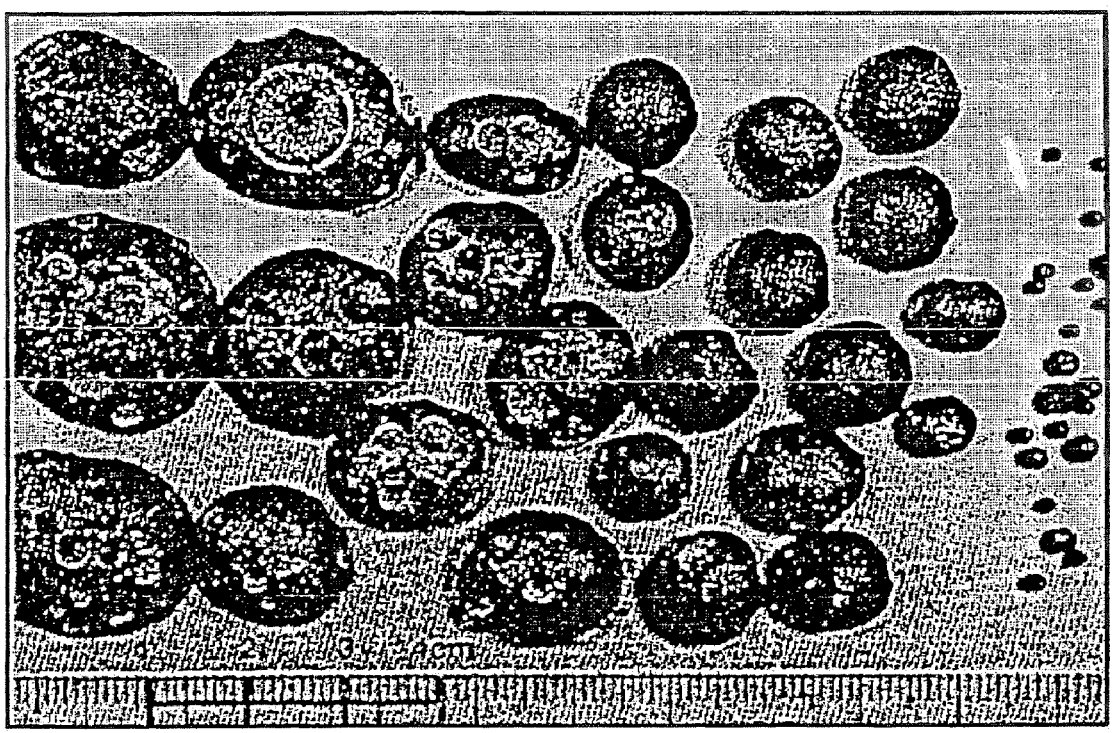
FIG. 15 is a photograph of metallic iron nuggets prepared in Example 2.

The time taken from feeding of the material compacts to discharging of the metallic iron was remarkably short, i.e., approximately 8 minutes. The resulting metallic iron had a carbon content of 2.10%, a Si content of 0.09%, and a S content of 0.07%. Since a CaO source was added to decrease the S content in this example, the S content was lower than that in Example 1. A photograph of the produced metallic iron nuggets is shown in FIG. 15, and 98% or more of the iron nuggets had a diameter in the range of 5 to 30 mm.

In this example, because the melting point of the by-product slag was decreased due to the addition of the CaO source, bleeding of the molten slag was feared during the latter period of the solid reduction. However, the example employed a two-stage heating process in which the temperature during the solid-reduction period was adjusted to 1,200 to 1,400° C. to produce reduced iron having a high metallization ratio by solid reduction, and then the resulting reduced iron was heated at 1,350 to 1,500° C. Moreover, because the coal power, i.e., the atmosphere adjustor, was bedded on a hearth, a problem of dissolution of hearth refractories due to bleeding of molten slag never occurred.

The microscopic structure of the reduced iron at the end stage of the solid reduction was examined in detail. In Example 1 not using a CaO source, Fe—(Mn)—S was present on the surface of the reduced iron at a high concentration. It was confirmed that during the carburization and melting, Fe—(Mn)—S was captured inside the molten iron. In contrast, in Example 2 using a CaO source, most sulfur was allowed to react with the CaO source and was fixed during the end stage of the solid reduction. It was confirmed that sulfur was prevented from entering the molten iron during the step of carburization and melting.

Another experiment was conducted as in the above-described experiment but by replacing the coal powder used as the atmosphere adjustor to fine-particle coal powder having a particle size of 2.0 mm or less. It was confirmed that the S content in the resulting metallic iron was decreased to 0.032%.

Example 3

Figure 16:
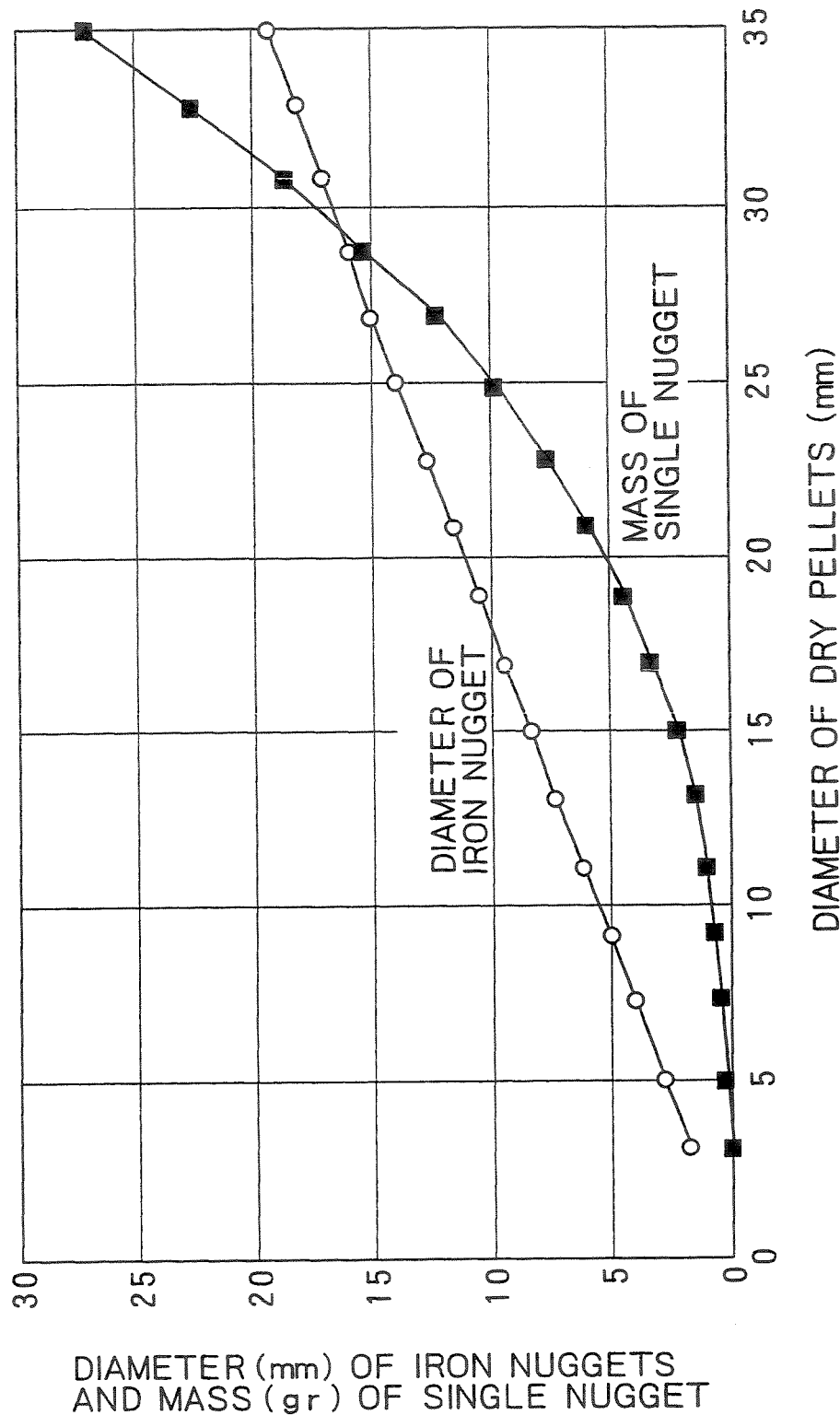
FIG. 16 is a graph showing the relationship between the diameter of the material compacts (dry pellets) and an average diameter and an average mass of the produced metallic iron nuggets.

An experiment was conducted under the same conditions as those in Example 1 and an actual furnace. In this experiment, the diameter of the material compacts (pellets) was varied within the range of 3 to 35 mm to examine the effect of the size of the material compacts on the average diameter and the average mass of the resulting metallic iron nuggets. The results are shown in FIG. 16.

As is apparent from this graph, metallic iron nuggets having a diameter in the range of 5 to 20 mm, i.e., the type of metallic iron nuggets exhibiting superior handling quality as the end-product metallic iron, could be effectively manufactured from material compacts (dry pellets) having a diameter of approximately 10 to 35 mm.

INDUSTRIAL APPLICABILITY

The present invention having the above-described configuration provides metallic iron nuggets having a high Fe purity, an adequate C content, and a suitable size for handling ease. The metallic iron nuggets further has low S, Si, and Mn contents, are easy to handle as an iron source, and has a reliable quality. As described above, these metallic iron nuggets can be efficiently and reliably manufactured with a high reproducibility by suitably controlling the manufacturing conditions.

The invention claimed is:

1. A method of making metallic iron nuggets, the method comprising:

reducing material compacts comprising a solid iron oxide source and a carbonaceous reductant to produce reduced solid iron to a reduction ratio of 80% or more, wherein said reduction ratio is defined by:

Reduction ratio=(amount of oxygen removed during the reduction process/amount of oxygen in the iron oxide in the material compact)×100 (%); and further heating, carburizing, melting, and causing cohesion of the resulting reduced solid iron in a reducing atmosphere to produce the metallic iron nuggets, wherein:

the temperature during the solid reduction is in a range of 1200 to 1400° C.;

the temperature during the heating, carburizing, and melting is in a range of 1300 to 1500° C.;

the reducing atmosphere is adjusted by an atmosphere adjuster;

the temperature during the solid reduction is from 50 to 200° C. lower than the temperature during the carburization, melting, and cohesion; and the resultant metallic iron nuggets have a diameter in a range of 1 to 30 mm.

2. The method according to claim 1, wherein 98% or more of the metallic iron nuggets produced have a diameter in a range of from 1 to 30 mm and comprise at least 94 mass % of metallic Fe and 1.0 to 4.5 mass % of C.

3. The method according to claim 1, wherein all of the metallic iron nuggets produced have a diameter in a range of from 1 to 30 mm and comprise at least 94 mass % of metallic Fe and 1.0 to 4.5 mass % of C.

4. The method according to claim 3, wherein the metallic iron nuggets produced have a uniform diameter.

5. The method according to claim 1, wherein the metallic iron nuggets produced further comprise 0.20 mass % or less of sulfur.

6. The method according to claim 1, wherein the metallic iron nuggets produced further comprise 0.02 to 0.5 mass % Si and less than 0.3 mass % Mn.

7. The method according to claim 1, said material compacts further comprising a CaO source to adjust the basicity (CaO/SiO$_2$) of a slag component to 0.6 to 1.8.

8. The method according to claim 1, wherein the metallic iron nuggets produced further comprise less than 0.08 mass % of sulfur.

9. The method according to claim 1, wherein the amount of carbonaceous reductant in said material compacts is such that a residual carbon content after reduction is 1.5 to 5.0%.

10. The method according to claim 1, wherein 98% or more of the metallic iron nuggets produced have a diameter in a range of from 5 to 30 mm and comprise at least 94 mass % of metallic Fe and 1.0 to 4.5 mass % of C.

11. The method according to claim 1, wherein said reduction ratio is 94% or more.

12. The method according to claim 1, wherein the amount of carbonaceous reductant in said material compacts is such that a residual carbon content after reducing said material compacts is 2.5 to 4.5%.

13. The method according to claim 1, wherein the atmosphere adjuster comprises a coal powder.

* * * * *